(12) United States Patent
Ozasa et al.

(10) Patent No.: US 12,092,560 B2
(45) Date of Patent: Sep. 17, 2024

(54) DETECTION METHOD AND DETECTION DEVICE

(71) Applicant: SYSMEX CORPORATION, Kobe (JP)

(72) Inventors: Masatsugu Ozasa, Kobe (JP); Daiki Fujiwara, Kobe (JP); Daiki Mita, Kobe (JP); Takaaki Okajima, Kobe (JP); Hideki Hirayama, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 263 days.

(21) Appl. No.: 17/536,437

(22) Filed: Nov. 29, 2021

(65) Prior Publication Data

US 2022/0170841 A1 Jun. 2, 2022

(30) Foreign Application Priority Data

Nov. 30, 2020 (JP) ................................ 2020-198870

(51) Int. Cl.
| | |
|---|---|
| *G01N 15/1434* | (2024.01) |
| *G01N 15/1404* | (2024.01) |
| *G01N 35/02* | (2006.01) |

(52) U.S. Cl.
CPC ..... *G01N 15/1436* (2013.01); *G01N 15/1404* (2013.01); *G01N 35/025* (2013.01)

(58) Field of Classification Search
CPC ........... G01N 15/1436; G01N 15/1404; G01N 35/025; G01N 2035/0413;
(Continued)

(56) References Cited

U.S. PATENT DOCUMENTS

| | | |
|---|---|---|
| 3,504,376 A | 3/1970 | Bednar et al. |
| 3,832,135 A | 8/1974 | Drozdowski et al. |
| | (Continued) | |

FOREIGN PATENT DOCUMENTS

| | | |
|---|---|---|
| GB | 1321754 A | 6/1973 |
| JP | S5418158 A | 2/1979 |
| | (Continued) | |

OTHER PUBLICATIONS

Extended European search report (EESR) issued on Apr. 28, 2022 in a counterpart European patent application.

(Continued)

*Primary Examiner* — Jonathan M Hansen
(74) *Attorney, Agent, or Firm* — METROLEX IP LAW GROUP, PLLC; Robert L. Scott, Esq.

(57) ABSTRACT

A detection method according to one or more embodiments may include transporting a rack holding a reaction vessel along a first axis toward a sample dispensing position, linearly moving the sample dispensing pipette above the rack along a second axis intersecting the first axis and dispensing a sample into the reaction vessel located at the sample dispensing position, transporting the rack along the first axis toward a reagent dispensing position; linearly moving a reagent dispensing pipette above the rack along a third axis intersecting the first axis, and dispensing a reagent into the reaction vessel located at the reagent dispensing position, and detecting a detection target in a measurement specimen prepared from the sample and the reagent.

20 Claims, 25 Drawing Sheets

(58) Field of Classification Search
CPC ....... G01N 2035/1076; G01N 35/1002; G01N 35/1011; G01N 35/04; G01N 15/14; G01N 21/47; G01N 21/64; G01N 35/00584; G01N 35/0092; G01N 35/02; G01N 35/10; G01N 35/1004; G01N 2035/00178; G01N 2035/00277; G01N 2035/0401; G01N 2035/0437

See application file for complete search history.

(56) References Cited

U.S. PATENT DOCUMENTS

| | | | |
|---|---|---|---|
| 5,175,086 A | 12/1992 | Takekawa et al. | |
| 2005/0042138 A1* | 2/2005 | Ueda | B01L 3/50825 422/63 |
| 2010/0119415 A1* | 5/2010 | Ogusu | G01N 35/1002 422/81 |
| 2013/0143309 A1* | 6/2013 | Thomas | G01N 15/14 435/287.2 |
| 2014/0287523 A1* | 9/2014 | Donohue | G01N 35/021 422/65 |
| 2014/0295536 A1 | 10/2014 | Yamada et al. | |
| 2020/0139360 A1* | 5/2020 | Limbach | G01N 35/1002 |
| 2021/0197188 A1* | 7/2021 | Huemer | G01N 35/109 |

FOREIGN PATENT DOCUMENTS

| | | |
|---|---|---|
| JP | S56142460 A | 11/1981 |
| JP | S5888661 A | 5/1983 |
| JP | H06241981 A | 9/1994 |
| JP | 2013-525816 A | 6/2013 |
| JP | 2021522483 A | 8/2021 |
| WO | 9946601 A1 | 9/1999 |
| WO | 2014/144759 A1 | 9/2014 |
| WO | 2019176296 A1 | 9/2019 |
| WO | 2019/204841 A1 | 10/2019 |

OTHER PUBLICATIONS

Office Action (EPOA) issued on Mar. 20, 2024 in counterpart European patent application 21 210 746.0-1001.
Office Action (JPOA) issued on May 7, 2024 in counterpart Japanese patent application 2020-198870.

\* cited by examiner

DETECTION METHOD AND DETECTION DEVICE

CROSS REFERENCE TO RELATED APPLICATIONS

This application claims priority from prior Japanese Patent Application No. 2020-198870, filed on Nov. 30, 2020, entitled "DETECTION METHOD AND DETECTION DEVICE", the entire contents of which are incorporated herein by reference.

FIELD OF THE INVENTION

The present invention relates to a detection method and a detection device for detecting a target object in a sample.

BACKGROUND

Japanese Unexamined Patent Application Publication (Translation of PCT Application) No. 2013-525816 describes a cell analysis device that prepares a sample by mixing the sample and an antibody reagent, and detects cells in the prepared sample. The cell analysis device of Japanese Unexamined Patent Application Publication (Translation of PCT Application) No. 2013-525816 uses a probe to dispense a sample in a sample tube and dispense a reagent placed in a reagent container into an enclosed region composed of a microtitration plate. The cell analyzer suctions the prepared sample/reagent combination from the enclosed region, and analyzes the sample via a flow cytometer. The cell analyzer cleans the probe at a washer station during and after sampling the specimens and reagents. The probe is provided so as to be movable in three axial directions of front-back, left-right, and vertical so that the sample or reagent can be dispensed into a plurality of wells provided vertically and horizontally on the microtitration plate.

SUMMARY OF THE INVENTION

In the device disclosed in Japanese Unexamined Patent Application Publication (Translation of PCT Application) No. 2013-525816, the sample and the reagent are repeatedly dispensed by one probe, so that there is a risk of contamination even though the probe is washed at the washer station. In order to reduce the risk of contamination, it is conceivable to separately dispense the sample and the reagent using a plurality of probes. In that case, while ensuring the movement range of each of the sample dispensing probe and the reagent dispensing probe in the three axial directions, it is necessary to keep a margin in the moving range of each probe so that the sample dispensing probe and the reagent dispensing probe do not interfere with each other, thus increasing the size of the device.

Therefore, the present invention provides a detection method and a detection device that can contribute to the compactness of the device and reduce the risk of contamination.

The detection method according to a first aspect of the present invention, as shown in FIG. 1, includes transporting a rack (50) holding a reaction vessel (51) along a first axis (41) toward a sample dispensing position (61); linearly moving the sample dispensing pipette (10) above the rack (50) along a second axis (42) intersecting the first axis (41) and dispensing a sample into the reaction vessel (51) located at the sample dispensing position (61), transporting the rack (50) along the first axis (41) toward a reagent dispensing position (62), linearly moving a reagent dispensing pipette (11) above the rack (50) along a third axis (43) intersecting the first axis (41), and dispensing a reagent into the reaction vessel (51) located at the reagent dispensing position (62), and detecting a detection target in a measurement specimen prepared from the sample and the reagent.

The detection method of the first aspect of the present invention includes transporting a rack (50) holding a reaction vessel (51) along a first axis (41) toward a sample dispensing position (61), linearly moving the sample dispensing pipette (10) above the rack (50) along a second axis (42) intersecting the first axis (41) and dispensing a sample into the reaction vessel (51) located at the sample dispensing position (61), transporting the rack (50) along the first axis (41) toward a reagent dispensing position (62), linearly moving a reagent dispensing pipette (11) above the rack (50) along a third axis (43) intersecting the first axis (41), and dispensing a reagent into the reaction vessel (51). In this way the sample dispensing pipette (10) and the reagent dispensing pipette (11) can be used to separately perform the sample dispensing and the reagent dispensing with different dispensing pipettes, and the risk of contamination can be reduced. The device also can be rendered more compact since the sample dispensing and reagent dispensing can be performed by a device configured to limit the range of movement of the sample dispensing pipette (10) and the reagent dispensing pipette (11) by transporting the rack (50) along the first axis (41).

As shown in FIG. 1, a flow cytometer (100), which is an example of the detection device according to a second aspect of the present invention, includes a transport unit (20) that transports a rack (50) holding a reaction vessel (51) along a first axis (41), a sample dispensing pipette (10) that dispenses a sample into the reaction vessel (51), a reagent dispensing pipette (11) that dispenses reagent into the reaction vessel (51), a pipette moving unit (70) that linearly moves the sample dispensing pipette (10) above the rack (50) along a second axis (42) intersecting the first axis (41), and linearly moves the reagent dispensing pipette (11) above the rack (50) along a third axis (43) intersecting the first axis (41), and a detection unit (30) that detects a detection target in a measurement specimen prepared from the sample and the reagent.

According to the flow cytometer (100) of the second aspect of the present invention includes the transport unit (20) that transports a rack (50) holding the reaction vessel (51) along a first axis (41), the sample dispensing pipette (10) that dispenses a sample into the reaction vessel (51), the reagent dispensing pipette (11) that dispenses reagent into the reaction vessel (51), the pipette moving unit (70) that linearly moves the sample dispensing pipette (10) above the rack (50) along a second axis (42) intersecting the first axis (41), and linearly moves the reagent dispensing pipette (11) above the rack (50) along a third axis (43) intersecting the first axis (41). In this way the sample dispensing pipette (10) and the reagent dispensing pipette (11) can be used to separately perform the sample dispensing and the reagent dispensing with different dispensing pipettes, and the risk of contamination can be reduced. The device also can be rendered more compact since the sample dispensing and reagent dispensing can be performed by a device configured to limit the range of movement of the sample dispensing pipette (10) and the reagent dispensing pipette (11) by transporting the rack (50) along the first axis (41).

Therefore, the present invention provides a detection method and a detection device that can contribute to the compactness of the device and reduce the risk of contamination.

DESCRIPTION OF THE EMBODIMENTS OF THE INVENTION

Hereinafter, embodiments will be described with reference to the drawings.

Overview of Flow Cytometer

First, the outline of the flow cytometer 100 according to one aspect of the present embodiment will be described with reference to FIGS. 1 and 2. The flow cytometer 100 is an example of a detection device that detects a detection target in a sample.

Figure 1:
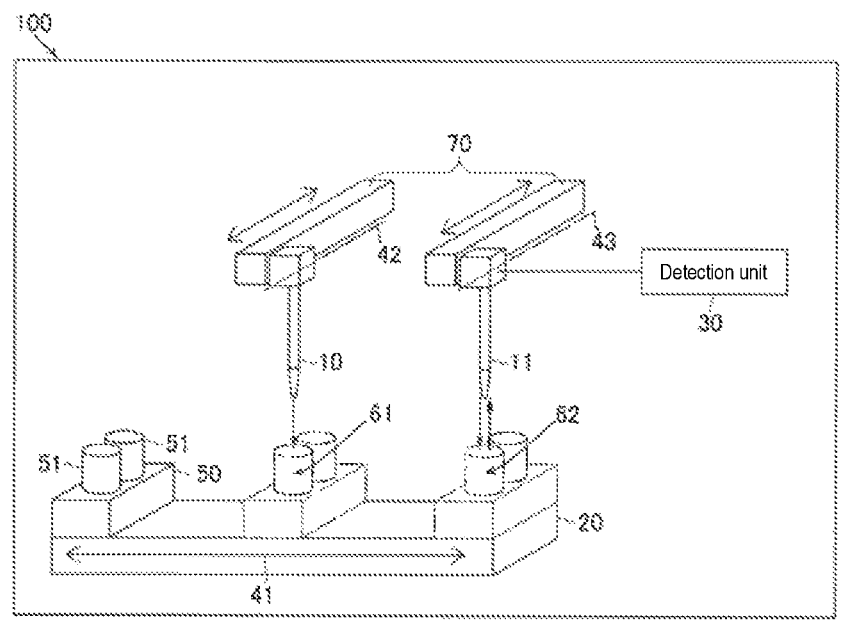
FIG. 1 is a schematic view showing an outline of a flow cytometer.

As shown in FIG. 1, the flow cytometer 100 is a measuring device for performing a measurement by a flow cytometric method in which a fluid in which particles are dispersed flows in a line shape and individual particles in the fluid are optically detected. The flow cytometer 100 of the present embodiment is configured to perform a pretreatment for preparing a measurement specimen for measurement by mixing a sample and a reagent.

The flow cytometer 100 includes a transport unit 20, a sample dispensing pipette 10, a reagent dispensing pipette 11, a pipette moving unit 70, and a detection unit 30.

The transport unit 20 is configured to transport the reaction vessel rack 50 holding the reaction vessel 51 along a first horizontal axis 41.

The reaction vessel 51 is a vessel capable of containing a liquid (sample, reagent) inside. The reaction vessel 51 has, for example, a tubular shape with an open top and a closed bottom. The liquid can be dispensed and suctioned by the sample dispensing pipette 10 and the reagent dispensing pipette 11, which will be described later, from the upper opening of the reaction vessel 51. The rack 50 (hereinafter, also referred to as a reaction vessel rack 50) holds the reaction vessel 51 in a state which allows the sample dispensing pipette 10 and the reagent dispensing pipette 11 to access the reaction vessel 51. The number of reaction vessels 51 that can be held by the reaction vessel rack 50 may be plural (for example, 24). In this case, the reaction vessel rack 50 holds a plurality of reaction vessels 51 so as to be arranged in a grid pattern parallel to, for example, the first horizontal axis 41 and a second horizontal axis 42 when installed on the transport unit 20 (refer to FIG. 2).

The transport unit 20 supports the reaction vessel rack 50 at a position where the reaction vessel 51 is below the sample dispensing pipette 10 and the reagent dispensing pipette 11. The transport unit 20 includes a moving mechanism described later for moving the reaction vessel rack 50 along the first horizontal axis 41.

The transport unit 20 moves the reaction vessel rack 50 along the first horizontal axis 41 to move the reaction vessel 51 to the respective dispensing positions (61, 62) of the sample dispensing pipette 10 and the reagent dispensing pipette 11. The sample dispensing position 61 is a position where the first horizontal axis 41 and the second horizontal axis 42 intersect in a top view. The reagent dispensing position 62 is a position at which the first horizontal axis 41 and the third horizontal axis 43 intersect in a top view. The pipette moving unit 70 moves the sample dispensing pipette 10 along the second horizontal axis 42 to just above the reaction vessel 51 at the sample dispensing position 61, and lowers the sample dispensing pipette 10. In this way one end of the sample dispensing pipette 10 enters the inside of the reaction vessel 51, and the liquid is dispensed into the reaction vessel 51. After dispensing, the pipette moving unit 70 raises the sample dispensing pipette 10 to retract one end of the sample dispensing pipette 10 from the inside of the reaction vessel 51. The pipette moving unit 70 moves the reagent dispensing pipette 11 along the third horizontal axis 43 to just above the reaction vessel 51 at the reagent dispensing position 62, and lowers the pipette. In this way one end of the reagent dispensing pipette 11 enters the inside of the reaction vessel 51, and the liquid is dispensed into the reaction vessel 51. After dispensing, the pipette moving unit 70 raises the reagent dispensing pipette 11 to retract one end of the reagent dispensing pipette 11 from the inside of the reaction vessel 51.

The pipette moving unit 70 is configured to linearly move the sample dispensing pipette 10 along the second horizontal axis 42. The sample dispensing pipette 10 has a hollow tubular shape and can suction a liquid inside. The sample dispensing pipette 10 has one end (lower end) open and the other end (upper end) connected to a fluid circuit for supplying suction pressure (negative pressure) and discharge pressure (positive pressure) through a flow path. In this way the sample dispensing pipette 10 can suction the liquid from one end by the suction pressure, and discharge the suctioned liquid from one end by the discharge pressure.

The pipette moving unit 70 is configured to linearly move the reagent dispensing pipette 11 along the third horizontal axis 43. The reagent dispensing pipette 11 has a hollow tubular shape and can suction a liquid inside. The reagent dispensing pipette 11 has one end (lower end) open and the other end (upper end) connected to a fluid circuit for supplying suction pressure (negative pressure) and discharge pressure (positive pressure) through a flow path. In this way the reagent dispensing pipette 11 can suction the liquid from one end by the suction pressure and discharge the suctioned liquid from one end by the discharge pressure.

The sample dispensing pipette 10 is configured to dispense the sample into the reaction vessel 51. The reagent dispensing pipette 11 is configured to dispense the reagent into the reaction vessel 51. That is, the transport unit 20 transports the reaction vessel rack 50 holding the reaction vessel 51 toward each of the sample dispensing position 61 and the reagent dispensing position 62 along the first horizontal axis 41. The sample dispensing pipette 10 is linearly moved along the second horizontal axis 42 by the pipette moving unit 70, and the sample is dispensed into the reaction vessel 51 located at the sample dispensing position 61. The reagent dispensing pipette 11 is linearly moved along the third horizontal axis 43 by the pipette moving unit 70, and the reagent is dispensed into the reaction vessel 51 located at the reagent dispensing position 62. A measurement specimen is prepared by reacting the sample and the reagent in the reaction vessel 51.

The detection unit 30 is configured to optically detect particles in the sample prepared from the sample and the reagent. The detection unit 30 flows the prepared sample in a line and optically detects individual particles in the fluid. As will be described later, the detection unit 30 includes a flow cell for flowing a sample containing particles, and a light source and a light receiving unit for optically detecting the particles.

In the example of FIG. 1, the reagent dispensing pipette 11 is located at the reagent dispensing position 62 and suctions the sample from the reaction vessel 51 containing the sample prepared from the sample and the reagent. The sample suctioned by the reagent dispensing pipette 11 is supplied to the detection unit 30. The detection unit 30 performs optical detection of the supplied sample.

The sample is, for example, blood. Blood is, for example, whole blood. The reagent is, for example, an antibody reagent that labels an antigen present on the cell surface or inside the cell in a sample. The antigens are, for example, CD3 and CD4, which are surface antigens of T cells. As the reagent, for example, a hemolytic agent for performing a hemolytic treatment of red blood cells may be additionally dispensed. In this way the antigen on the cell surface that has reacted with the antibody contained in the antibody reagent is detected in the sample.

Effect of Flow Cytometer

As described above, the flow cytometer 100 according to one aspect of the present embodiment is provided with a transport unit 20 for transporting the reaction vessel 51 held in the reaction vessel rack 50 along the first horizontal axis 41, and a pipette moving unit 70 that linearly moves the sample dispensing pipette 10 that dispenses the sample into the reaction vessel 51 above the reaction vessel rack 50 along the second horizontal axis 42 which intersects the first horizontal axis 41, and linearly moves the reagent dispensing pipe 11 for dispensing the reagent into the reaction vessel 51 above the reaction vessel rack 50 along the third horizontal axis 43 that intersects the first horizontal axis 41. In this way the sample dispensing pipette 10 and the reagent dispensing pipette 11 can be used to separately perform the sample dispensing and the reagent dispensing with different dispensing pipettes, and the risk of contamination can be reduced. Further, by transporting the reaction vessel rack 50 along the first horizontal axis 41, the sample dispensing pipette 10 and the reagent dispensing pipette 11 are dispensed in a state in which the movement range in the horizontal plane is limited to a single straight line to dispense the sample and dispense the reagent so that the device can be rendered more compact.

Structural Example of Flow Cytometer

A structural example of the flow cytometer according to the embodiment will be described in detail with reference to FIGS. 2 to 6.

In FIGS. 2 to 6, the two axes orthogonal to each other in the horizontal plane are the X-axis and the Y-axis, and the vertical axis is the Z-axis.

Figure 2:
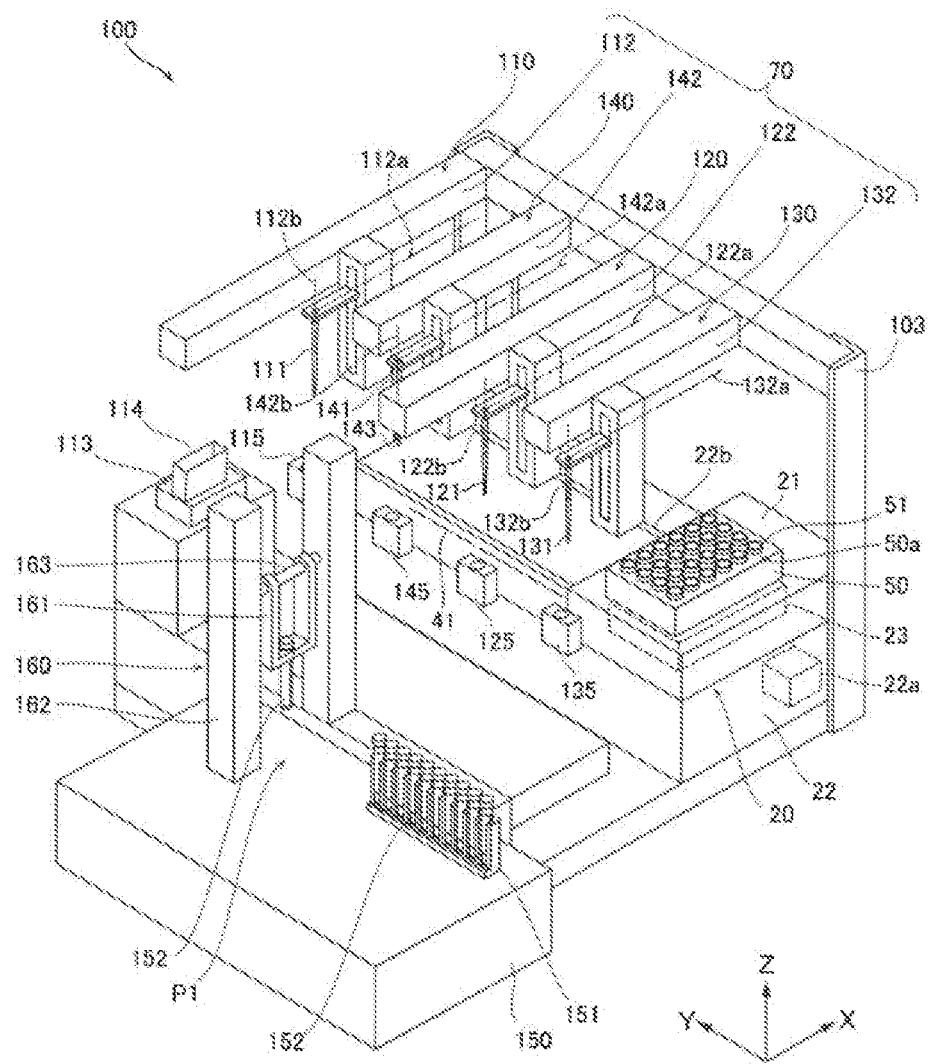
FIG. 2 is a perspective view showing a structural example of a flow cytometer.
Figure 3:
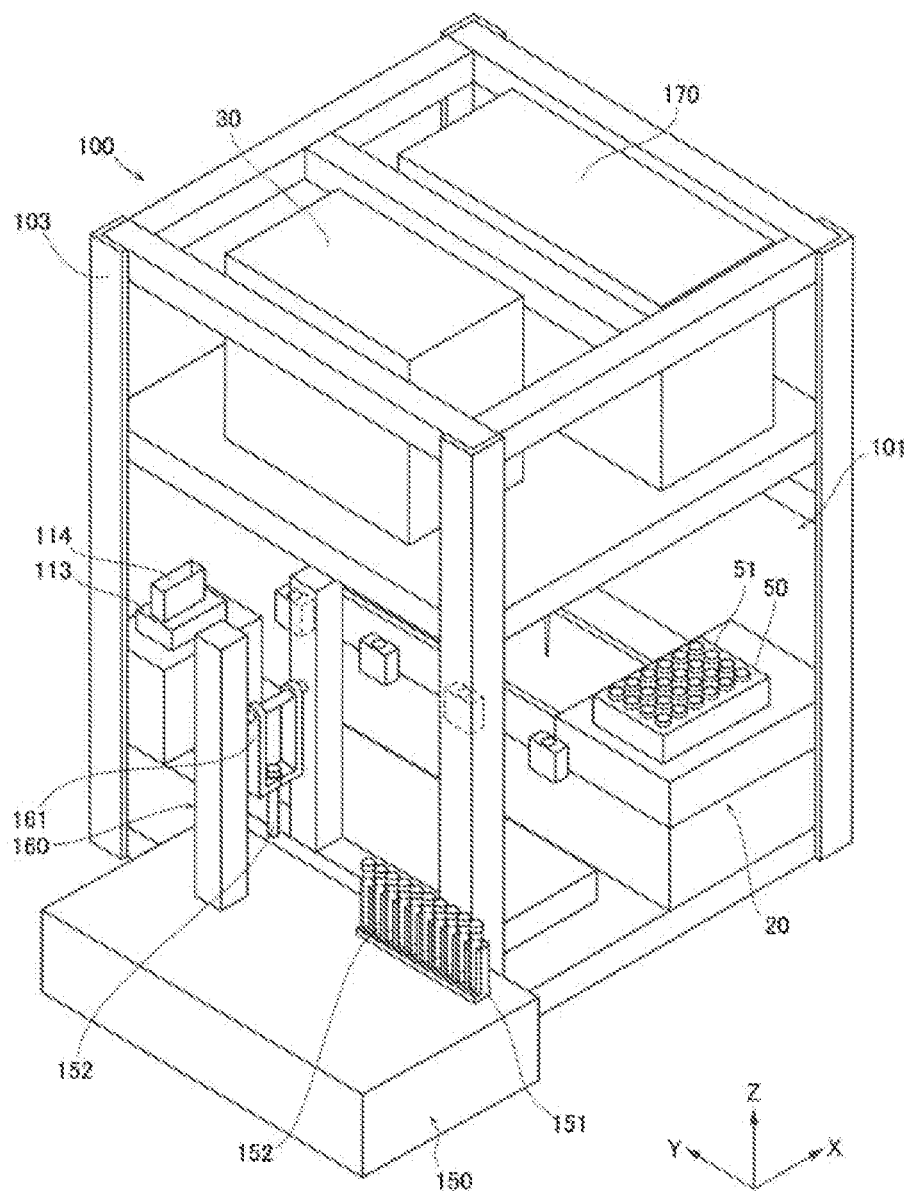
FIG. 3 is a perspective view showing a detection unit and a control unit of a flow cytometer.

In the structural examples of FIGS. 2 and 3, the flow cytometer 100 includes a plurality of pipettes 111, 121, 131, 141, 143, a transport unit 20, and a detection unit 30 (see FIG. 3). The flow cytometer 100 includes an antibody dispensing pipette 111, a sample dispensing pipette 121, a reagent dispensing pipette 131, a suction pipette 141, and a washing pipette 143 as examples of the plurality of pipettes shown in FIG. 1. Note that in the structural example of FIG. 2, an antibody dispensing pipette 111 and a reagent dispensing pipette 131 are provided as reagent dispensing pipettes.

The flow cytometer 100 includes an antibody dispensing unit 110 that dispenses an antibody into the reaction vessel 51, a sample dispensing unit 120 that dispenses a sample into the reaction vessel 51, a reagent dispensing unit 130 that dispenses a reagent into the reaction vessel 51, and a suction cleaning unit 140 for suctioning a sample prepared from the sample and the reagent dispensed into the reaction vessel 51 and washing the reaction vessel 51 into which the sample is suctioned. Each unit is provided with a pipette. The flow cytometer 100 also includes a sample transport unit 150 that transports the sample rack 151, and a stirring unit 160 that picks up the sample container 152 from the sample rack 151 and stirs the sample stored in the sample container 152. Unit means a group of devices configured to perform a predetermined function in the flow cytometer 100. The flow cytometer 100 also includes a housing 103 (see FIG. 3) that houses the transport unit 20 and the pipette moving unit 70.

The antibody dispensing unit 110 includes an antibody dispensing pipette 111. The antibody dispensing pipette 111 is configured to dispense the antibody reagent into the reaction vessel 51. The antibody dispensing unit 110 includes an antibody dispensing pipette moving unit 112 that moves the antibody dispensing pipette 111. The antibody dispensing pipette moving unit 112 can linearly move the antibody dispensing pipette 111 along the third horizontal axis 112a parallel to the X-axis and the vertical axis 112b parallel to the Z-axis, and is further capable of linearly moving the antibody dispensing pipette 111 in the Y-axis direction. The flow cytometer 100 includes an antibody set unit 113 in which an antibody reagent container 114 containing an antibody reagent is installed on the front side of a housing 103 (see FIG. 3) along the third horizontal axis 112a. The antibody dispensing pipette moving unit 112 linearly moves the antibody dispensing pipette 111 along the third horizontal axis 112a so as to be located at the suction position of the antibody reagent. The antibody dispensing pipette 111 suctions the antibody reagent from the antibody reagent container 114 installed in the antibody setting unit 113 arranged at the position on the third horizontal axis 112a of the antibody dispensing pipette 111, and suctions the antibody reagent which is then dispensed into the reaction vessel 51. Note that the front side of the housing 103 is the side on which the sample transport unit 150 is provided.

The sample dispensing unit 120 includes a sample dispensing pipette 121. The sample dispensing pipette 121 is configured to dispense the sample into the reaction vessel 51. The sample dispensing unit 120 includes a sample dispensing pipette moving unit 122 for moving the sample dispensing pipette 121. The sample dispensing pipette moving unit 122 can move the sample dispensing pipette 121 along the second horizontal axis 122a parallel to the X-axis and the vertical axis 122b parallel to the Z-axis, but is configured to not move the sample dispensing pipette 121 in the Y-axis direction. The sample dispensing pipette 121 can suction the sample from the sample container 152 arranged at the sample suction position X12 (see FIGS. 4 and 6) described later, and dispense the suctioned sample into the reaction container 51.

The reagent dispensing unit 130 includes a reagent dispensing pipette 131. The reagent dispensing pipette 131 is configured to dispense the reagent into the reaction vessel 51. The reagent dispensing unit 130 includes a reagent dispensing pipette moving unit 132 that moves the reagent dispensing pipette 131. The reagent dispensing pipette moving unit 132 can move the reagent dispensing pipette 131 along the fifth horizontal axis 132a parallel to the X axis and the vertical axis 132b parallel to the Z axis, but is configured to not move the reagent dispensing pipette 131 in the Y-axis direction. The reagent dispensing pipette 131 is fluidly connected to the reagent container containing the reagent, and the reagent can be dispensed into the reaction vessel 51.

The suction cleaning unit 140 includes a suction pipette 141. The suction pipette 141 is configured to suction the sample from the reaction vessel 51 into the flow cell 201 (see FIG. 7) through which the sample of the detection unit 30 passes. In this way the sample suctioned from the reaction vessel 51 can be sent to the detection unit 30 by the suction pipette 141, which is separate from the pipette for dispensing the sample and the reagent, so that contamination can be suppressed.

The suction cleaning unit 140 also includes a cleaning pipette 143. The cleaning pipette 143 is configured to move integrally with the suction pipette 141, dispense the washing liquid into the reaction vessel 51 into which the sample is suctioned, and suction the dispensed washing liquid. Since the reaction vessel 51 can be cleaned by the cleaning pipette 143, the reaction vessel 51 can be used repeatedly without being discarded each time the reaction vessel 51 is used.

The suction cleaning unit 140 includes a suction pipette moving unit 142 for moving the suction pipette 141 and the cleaning pipette 143. The suction pipette moving unit 142 can move the suction pipette 141 and the cleaning pipette 143 along the fourth horizontal axis 142a parallel to the X-axis and the vertical axis 142b parallel to the Z-axis, and is configured to not move in the Y-axis direction. The cleaning pipette 143 and the suction pipette 141 are held by the suction pipette moving unit 142 so as to be bundled in pairs.

The antibody dispensing unit 110, the sample dispensing unit 120, the reagent dispensing unit 130, and the suction cleaning unit 140 are arranged along the first horizontal axis 41 (Y-axis) which is the transport direction of the reaction vessel rack 50 by the transport unit 20. The pipette moving unit 70 is configured to include a pipette moving unit provided in each dispensing unit. That is, the pipette moving unit 70 includes an antibody dispensing pipette moving unit 112, a sample dispensing pipette moving unit 122, a reagent dispensing pipette moving unit 132, a suction pipette moving unit 142, and the individual pipettes (antibody dispensing pipette 111, sample dispensing pipette 121, reagent dispensing pipette 131, suction pipette 141) are moved by these pipette moving units. The second horizontal axis 122a, the third horizontal axis 112a, the fourth horizontal axis 142a, and the fifth horizontal axis 132a are axes parallel to each other.

The flow cytometer 100 includes a first cleaning unit 125 for cleaning the sample dispensing pipette 121 and a second cleaning unit 115 for cleaning the antibody dispensing pipette 111. The flow cytometer 100 further includes a third cleaning unit 135 for cleaning the reagent dispensing pipette 131 and a fourth cleaning unit 145 for cleaning the suction pipette 141.

The first cleaning unit 125 is arranged so as to correspond to the sample dispensing pipette 121. The second cleaning unit 115 is arranged so as to correspond to the antibody dispensing pipette 111. The third cleaning unit 135 is arranged so as to correspond to the reagent dispensing pipette 131. The fourth cleaning unit 145 is arranged so as to correspond to the suction pipette 141. That is, the second cleaning unit 115, the first cleaning unit 125, the third cleaning unit 135, and the fourth cleaning unit 145 are arranged at positions along the X-axis for the antibody dispensing pipette 111, the sample dispensing pipette 121, the reagent dispensing pipette 131, and the suction pipette 141, respectively. By arranging the cleaning units for cleaning each pipette in association with each pipette in this way, it is possible to clean each pipette individually. Further, while one pipette is being washed, another pipette can be used, and a series of processes of the flow cytometer 100 can be smoothly executed. The second cleaning unit 115, the first cleaning unit 125, the third cleaning unit 135, and the fourth cleaning unit 145 are respectively arranged on the front side of the housing 103 (see FIG. 3).

Each cleaning unit (second cleaning unit 115, first cleaning unit 125, third cleaning unit 135, and fourth cleaning unit 145) has substantially the same structure. Each cleaning unit has a container shape with an open top and is located at the bottom of each unit of each pipette so that each pipette can be cleaned. Each cleaning unit can store and drain the cleaning liquid for cleaning the pipette. By inserting the pipette into the cleaning unit, the outer surface of the pipette can be cleaned, and by suctioning the cleaning liquid, the inside of the pipette and the flow path can be cleaned.

The transport unit 20 is arranged below the antibody dispensing unit 110, the sample dispensing unit 120, the reagent dispensing unit 130, and the suction cleaning unit 140 (that is, below the Z-axis). The transport unit 20 includes a support unit 21 that supports the reaction vessel rack 50, and a lateral feed mechanism 22 that moves the support unit 21 along a first horizontal axis 41 parallel to the Y-axis. The lateral feed mechanism 22 includes a motor 22a, a transmission mechanism that transmits the driving force of the motor 22a to the support unit 21, and a guide rail 22b along the Y-axis. The transmission mechanism is, for example, a belt-pulley mechanism.

The transport unit 20 is configured to transport the reaction vessel rack 50 in a straight line along the first horizontal axis 41. In this way the moving range of the transport unit 20 can be limited as compared with the case wherein the reaction vessel rack 50 is moved in multiple directions or moved in a curved orbit (for example, an arc or meandering orbit), so that the apparatus can be downsized.

As described above, in the structural examples of FIGS. 2 to 6, the first horizontal axis 41 is parallel to the Y-axis. The second horizontal axis 122a, the third horizontal axis 112a, the fourth horizontal axis 142a, and the fifth horizontal axis 132a are orthogonal to the first horizontal axis 41 and parallel to the X-axis. Therefore, the second horizontal axis 122a, the third horizontal axis 112a, the fourth horizontal axis 142a, and the fifth horizontal axis 132a are parallel to each other. The transport unit 20 is configured to horizontally move the reaction vessel 51 in a direction (Y-axis direction) that intersects the movement direction (X-axis direction) of each pipette (antibody dispensing pipette 111, sample dispensing pipette 121, reagent dispensing pipette 131, suction pipette 141), so that the reaction vessel 51 is located at each of the sample dispensing position and the reagent dispensing position.

The transport unit 20 has a swing mechanism 23 that swings the reaction vessel rack 50. The swing mechanism 23 is housed in the support unit 21, and the reaction vessel rack 50 is installed on the upper surface of the swing mechanism 23. The swing mechanism 23 swings the reaction vessel rack 50 in the horizontal plane (that is, in the XY plane) by driving the eccentric rotation mechanism with a motor. By swinging, the sample in the reaction vessel 51 into which the sample and the reagent are dispensed can be stirred.

The sample transport unit 150 provides a place for installing the sample rack 151 that holds the sample container 152. The sample transport unit 150 transports the sample rack 151 installed by the user. By moving the sample rack 151, the sample transport unit 150 transports the sample container 152 held in the sample rack 151 to the sample take-out position P1. The sample container 152 is a cylindrical container having an open upper end and a closed bottom.

The stirring unit 160 has a function of grasping the sample container 152 transported to the sample take-out position P1 and taking it out from the sample rack 151 to stir the sample in the sample container 152. The stirring unit 160 includes a pair of gripping parts 161 that grip the sample container 152 across the side surface, and a drive mechanism 162 that operates the pair of gripping parts 161. The drive mechanism 162 has an operation of opening and closing the pair of grip parts 161 along the shaft 163, an operation of moving the pair of gripping parts 161 up and down, and an operation of rotating the pair of gripping parts 161 around the shaft 163.

The stirring unit 160 grips the sample container 152 at the sample takeout position P1 by the pair of gripping parts 161 and pulls out the sample container 152 from the sample rack 151 by moving the pair of gripping parts 161 upward. The stirring unit 160 tilts the sample container 152 by rotating the pair of gripping parts 161 while gripping the sample container 152, and overturns and stirs the sample. The stirring unit 160 sets the sample container 152 after stirring in the container transfer unit 165 (see FIG. 4) and releases the grip of the sample container 152. The stirring unit 160 also performs an operation of returning the sample container 152 after suctioning the sample to the sample rack 151.

Figure 4:
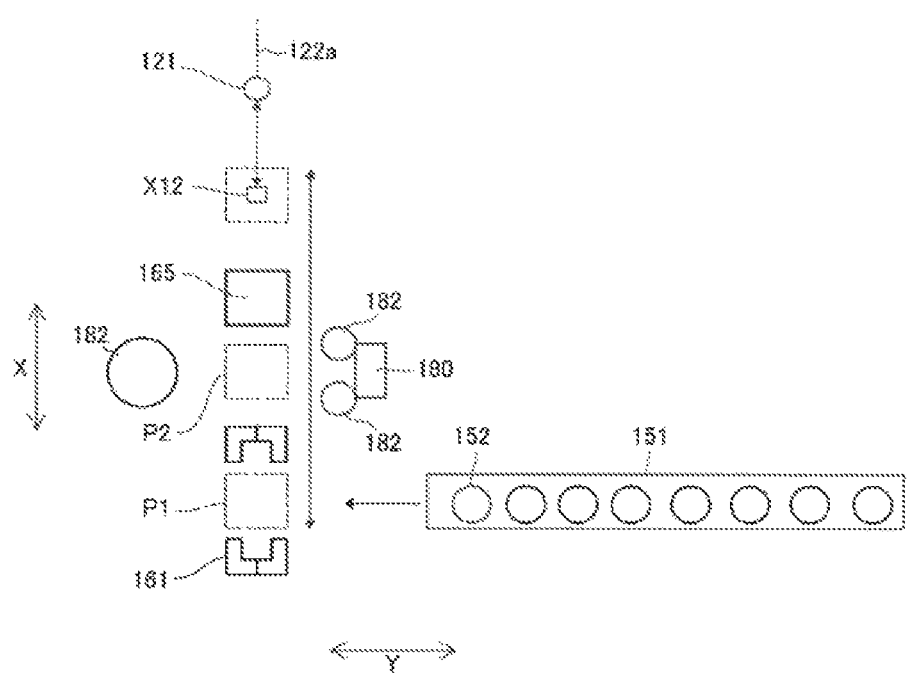
FIG. 4 is a schematic plan view showing a reading unit and a container transfer unit.

As shown in FIG. 4, the container transfer unit 165 is configured to receive and hold one sample container 152. The container transfer unit 165 can transport the held sample container 152 to a position above the sample takeout position P1, a reading position P2, and a sample suction position X12.

The flow cytometer 100 includes a reading unit 180 that reads sample information from a sample container 152 containing a sample. The reading unit 180 reads the sample information from the information recording medium provided to the sample container 152 conveyed to the reading position P2. The sample container 152 is detected by acquiring the sample information. The information recording medium is, for example, a barcode, which is affixed to the side surface of each sample container 152. The recorded sample information includes the sample ID.

In the example shown in FIG. 4, the reading unit 180 is composed of a barcode reader that rotates the sample container 152 around an axis by three roller-shaped rotation support units 182 and reads a barcode attached to the outer wall of the sample container 152. The reading unit 180 functions as a detection unit that detects a sample container containing a sample.

As shown in FIG. 3, in the flow cytometer 100, the detection unit 30 and the control unit 170 are installed on the upper part of the measuring mechanism accommodating unit 101 provided with the antibody dispensing unit 110, the sample dispensing unit 120, the reagent dispensing unit 130, the suction cleaning unit 140, and the transporting unit 20. The detection unit 30 and the control unit 170 are disposed at positions arranged (overlapping) along the Z axis with respect to the units installed in the measurement mechanism accommodating unit 101. In this way the installation area of the device can be reduced.

Dispensing Unit

Figure 5:
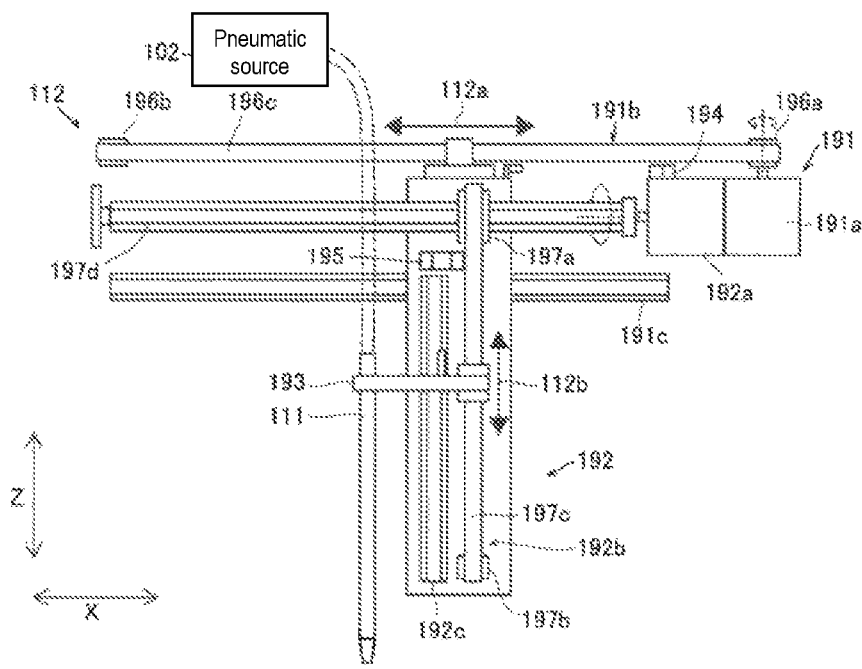
FIG. 5 is a schematic side view showing a structural example of a pipette moving unit.

The structures of the antibody dispensing pipette moving unit 112, the sample dispensing pipette moving unit 122, the reagent dispensing pipette moving unit 132, and the suction pipette moving unit 142 will be described with reference to FIG. 5. Each pipette moving unit (112, 122, 132, 142) has substantially the same structure except that the range of movement along each axis is different. In FIG. 5, the antibody dispensing pipette moving unit 112 is illustrated as representative of each pipette moving unit.

The antibody dispensing pipette moving unit 112 includes a linear motion mechanism 191 along the X-axis (horizontal axis) and a linear motion mechanism 192 along the Z-axis (vertical axis). The linear motion mechanism 191 and the linear motion mechanism 192 are moving mechanisms capable of reciprocating in the linear direction.

The linear motion mechanism 191 includes a motor 191a, a transmission mechanism 191b, and a linear guide 191c. The transmission mechanism 191b is a belt-pulley mechanism including a driven pulley 196a and a driven pulley 196b that are rotationally driven by a motor 191a, and an annular belt 196c that is hung between the driven pulley 196a and the driven pulley 196b. The rotation of the motor 191a causes the belt 196c to be circulated and driven along the X-axis (horizontal axis 112a). The linear motion mechanism 192 fixed to the belt 196c is guided by the linear guide 191c and moved along the X-axis (horizontal axis 112a).

Similarly, the linear motion mechanism 192 includes a motor 192a, a transmission mechanism 192b, and a linear guide 192c. The transmission mechanism 192b is a belt-pulley mechanism including a driven pulley 197a and a driven pulley 197b that are rotationally driven by a motor 192a, and an annular belt 197c that is hung between the driven pulley 197a and the driven pulley 197b. The main pulley 197a is provided so as to be slidable to the X-axis (horizontal shaft 112a) with respect to the shaft 197d connected to the rotation shaft of the motor 192a and to rotate integrally with the shaft 197d. The shaft 197d has a polygonal cross section and meshes with the main pulley 197a in the rotational direction while allowing the main pulley 197a to move along the X-axis (horizontal axis 112a). The rotation of the motor 192a causes the belt 197c to be circulated and driven along the Z-axis (vertical axis 112b). The holding member 193 fixed to the belt 197c is guided by the linear guide 192c and moved along the Z-axis (vertical axis 112b). A pipette (antibody dispensing pipette 111) is provided on the holding member 193. The holding member 193 holds the pipette positioned downward on the Z-axis.

According to this structure, each pipette of each dispensing/suction unit (antibody dispensing pipette 111, sample dispensing pipette 121, reagent dispensing pipette 131, suction pipette 141 and washing pipette 143) is arranged so as to move along the X-axis and the Z-axis. The motor 191a and the motor 192a are, for example, stepping motors.

The antibody dispensing pipette moving unit 112, the sample dispensing pipette moving unit 122, the reagent dispensing pipette moving unit 132, and the suction pipette moving unit 142 linearly move each pipette (antibody dispensing pipette 111, sample dispensing pipette 121, reagent dispensing pipette). 131, suction pipette 141) individually. The antibody dispensing pipette moving unit 112, the sample dispensing pipette moving unit 122, the reagent dispensing pipette moving unit 132, and the suction pipette moving unit 142 are individually controlled by the control unit 170. In the example of FIG. 5, the origin sensor 194 that detects the origin position of the pipette along each horizontal axis (112a, 122a, 132a, 142a) of the pipette, and the origin sensor 195 that detects the pipette position of the pipette along the vertical axis (112b, 122b, 132b, 142b) are provided. The origin sensor 194 is arranged at the end of the movement range along the horizontal axis (that is, the movement limit). The origin sensor 195 is arranged at the upper end of the movement range on the vertical axis. The axial position of the pipette is controlled by the amount of movement from the origin position.

The upper end of each pipette (antibody dispensing pipette 111, sample dispensing pipette 121, reagent dispensing pipette 131, suction pipette 141, and cleaning pipette 143) is connected to pneumatic source 102. The liquid is suctioned and discharged from the tip of each pipette by the negative pressure and the positive pressure supplied from the pneumatic source 102.

Figure 6:
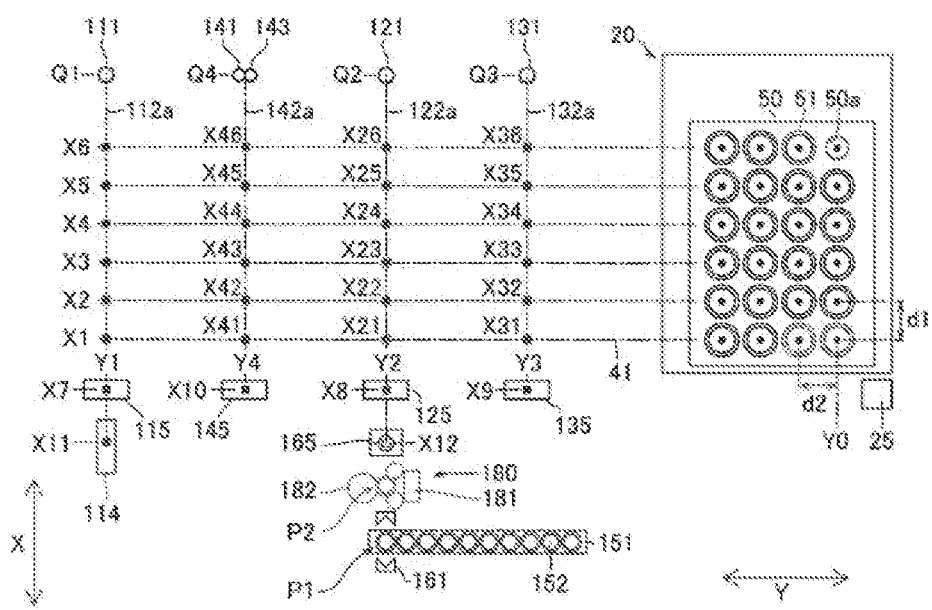
FIG. 6 is a schematic diagram illustrating the movement of a pipette and a reaction vessel rack.

Pipette and Reaction Vessel Movement FIG. 6 is a schematic plan view showing the positions of the antibody dispensing pipette 111, the sample dispensing pipette 121, the reagent dispensing pipette 131, the suction pipette 141, the cleaning pipette 143, and the holding position of the reaction vessel 51 by the reaction vessel rack 50.

The reaction vessel rack 50 is formed with a plurality of holding holes 50a for holding the reaction vessel 51. The plurality of holding holes 50a are formed so as to be arranged in a grid pattern. In this way a large number of reaction vessels 51 can be held compactly.

The reaction vessel 51 is inserted into one holding hole 50a of the reaction vessel rack 50 one by one. The reaction vessel rack 50 is installed in the transport unit 20 so that a plurality of holding holes 50a are arranged in a grid pattern parallel to the X-axis and the Y-axis. Note that FIG. 6 shows a state in which the reaction vessel 51 is removed only from the holding hole 50a in the upper right corner of the reaction vessel rack 50 in the FIG. 6.

The spacing d1 between the plurality of holding holes 50a arranged in the direction parallel to the X-axis (center position spacing of the holding holes) is constant, and the spacing d2 between the plurality of holding holes 50a arranged in the direction parallel to the Y-axis (center position spacing of the holding holes) is constant. In the structural example of FIG. 6, the reaction vessel rack 50 is formed with 6 rows of holding holes 50a in the direction parallel to the X-axis and 4 rows of holding holes 50a in the direction parallel to the Y-axis, and a total of 24 reaction vessels 51 can be held.

Each pipette can be moved to six dispensing/suction positions X1 to X6 and one cleaning position (X7, X8, X9 or X10) along each horizontal axis (112a, 122a, 132a, 142a). Specifically, the movement of the pipette to the dispensing/suction positions X1 to X6 is controlled by the control unit 170 based on the distance along each horizontal axis from the origin position (Q1, Q2, Q3, Q4) to the dispensing/suction positions X1 to X6 and the feed amount per pulse of the motor.

The transport unit 20 is controlled to move the rack 50 toward the four positions Y1 to Y4 along the first horizontal axis 41. Positions Y1 to Y4 are positions at which the first horizontal axis 41 intersects the horizontal axis (112a, 122a, 132a, or 142a) of each pipette. Specifically, the control unit 170 controls the transport unit 20 so that the reaction vessels 51 held in the four holding holes 50a on the front side of the housing 103 are positioned at the respective positions Y1 to Y4 on the first horizontal axis 41 based on the distance along the first horizontal axis 41 from the reference holding hole 50a at the origin position Y0 to each pipette position, the distance d2 of the plurality of holding holes 50a, and the feed amount per pulse of the motor. For example, when any of the reaction vessels 51 held in the four holding holes 50a on the front side of the housing 103 is located at the position Y1, the five reaction vessels 51 arranged in the X-axis direction with respect to the reaction vessel 51 located at position Y1 are positioned at positions X2 to X6, respectively. The origin position Y0 is detected by the origin sensor 25. Position Y1 is the antibody dispensing position by the antibody dispensing pipette 111. Position Y2 is the sample dispensing position by the sample dispensing pipette 121. Position Y3 is the second reagent dispensing position by the reagent dispensing pipette 131. Position Y4 is the suction cleaning position by the suction pipette 141 and the cleaning pipette 143.

In this way any of the four rows of holding holes 50a along the first horizontal axis 41 can be moved to a position on the horizontal axis (112a, 122a, 132a, or 142a) of the dispensing pipette, and a dispensing operation and a suction operation are performed on the reaction vessel 51 held in the arbitrary holding hole 50a by moving the pipette to any of the six dispensing/suction positions X1 to X6. In this way, a row of reaction vessels 51 including one reaction vessel 51 for dispensing can be positioned below the movement path of the antibody dispensing pipette 111 by the transport unit 20 transporting the reaction vessel rack 50 along the first horizontal axis 41, thereby transporting the reaction vessel rack 50 along the first horizontal axis 41. The antibody dispensing pipette moving unit 112 can linearly move the antibody dispensing pipette 111 along the third horizontal axis 112 a so that the antibody dispensing pipette 111 can access one of the reaction vessels 51 for dispensing among the reaction vessels 51 in the row below the movement path. The same applies to the dispensing pipettes other than the antibody dispensing pipette 111 and the pipette moving units.

Looking at the range of movement of the individual pipettes, the antibody dispensing pipe 111 is moved from an origin position Q1, a dispensing/suction position X1 to X6, a cleaning position X7 of the second cleaning unit 115, and to the antibody suction position X11 from the antibody reagent container 114. The sample dispensing pipette 121 moves along the second horizontal axis 122a from the origin position Q2, the dispensing/suction positions X21 to X26, the cleaning position X8 of the first cleaning unit 125, and the sample container 152 to the sample suction position X12. The reagent dispensing pipette 131 is moved along the fifth horizontal axis 132a to the origin position Q3, the dispensing/suction positions X31 to X36, and the cleaning position X9 of the third cleaning unit 135. The suction pipette 141 and the cleaning pipette 143 are moved along the fourth horizontal axis 142a to the origin position Q4, the dispensing/suction positions X41 to X46, and the cleaning position X10 of the fourth cleaning unit 145.

Note that, in FIG. 6, the origin positions Q1 to Q4 of each pipette are schematically shown as the same positions on the X-axis (positions arranged along the Y-axis), but the origin positions of the pipettes are actually different. Therefore, for example, when each pipette is moved to the dispensing/suction position X1, the moving distance from the origin position is different for each pipette. Similarly, the cleaning positions X7 to X10 are shown as the same positions on the X-axis (positions arranged along the Y-axis), but the cleaning positions of the pipettes are different.

Detailed Structure of Detection Unit

A structural example of the detection unit 30 will be described with reference to FIG. 7. In the example shown in FIG. 7, the detection unit 30 includes a flow cell 201 through which the particle-containing liquid in the sample passes, light sources 202a and 202b that irradiate the particles passing through the flow cell 201 with light, the light receiving elements 208, 214, 215, 219, and 220 that receive light derived from the particles and output detection signals that are converted to electric signals. The light source 202a is, for example, a laser diode having a wavelength of 488 nm, and the light source 202b is, for example, a laser diode having a wavelength of 638 nm.

In the present embodiment, the light emitted from the particles when the light is irradiated is collectively referred to as the light derived from the particles. Light derived from particles includes scattered light and fluorescence. The light derived from the particles may be light of any wavelength, but is preferably light having a peak wavelength in the range of 400 nm to 850 nm. It also is preferable that the peak wavelength of the light derived from the particles is different for each measurement item.

Figure 7:
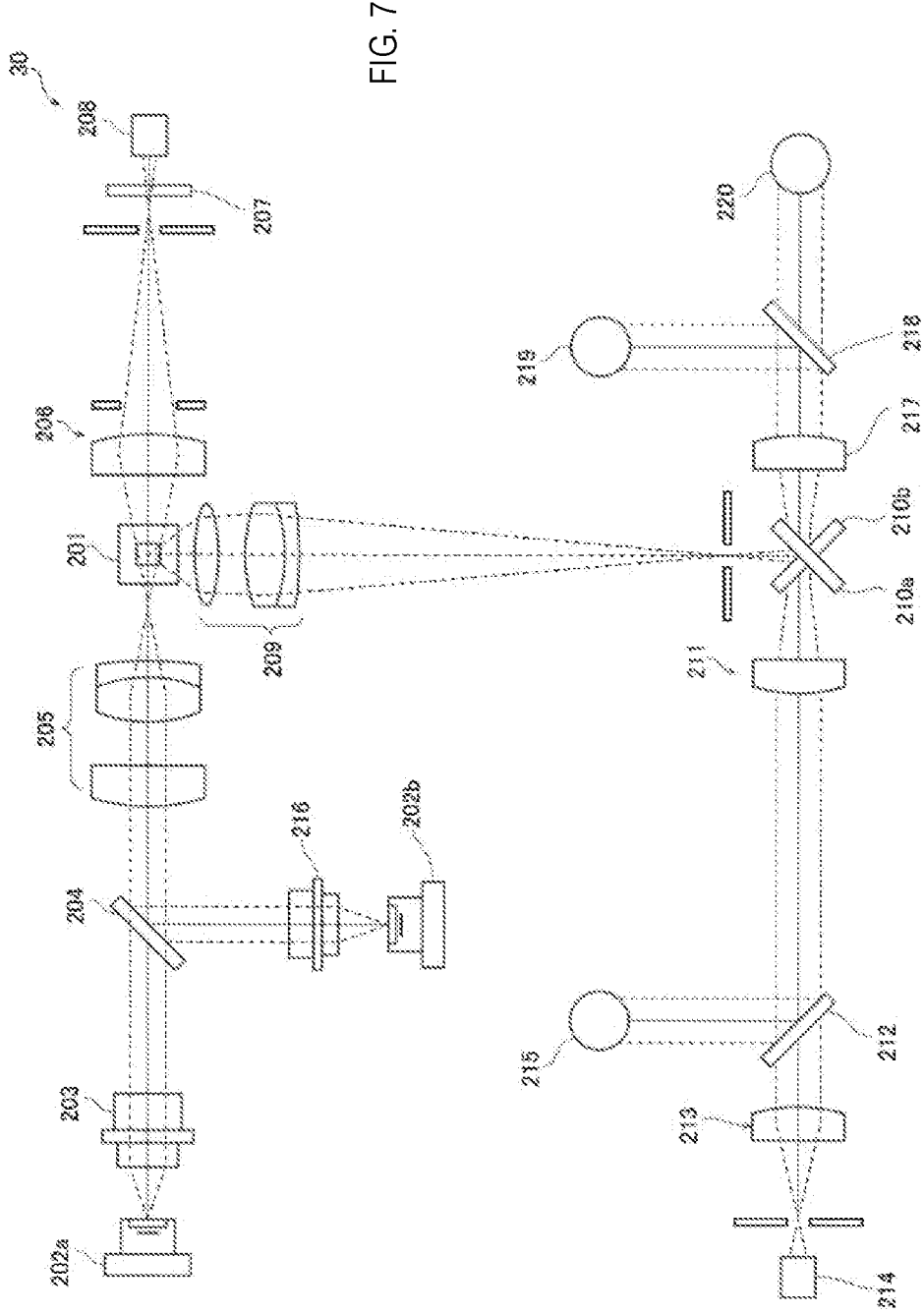
FIG. 7 is a schematic view showing a structural example of an optical system included in the detection unit.

In the example of FIG. 7, the light emitted from the light source 202a is applied to the flow cell 201 via the collimating lens 203, the dichroic mirror 204, and the lens system 205. The forward scattered light derived from the particles passing through the flow cell 201 is collected by the lens system 206, passes through the bandpass filter 207, and is incident on the light receiving element 208.

The laterally scattered light and the lateral fluorescence derived from the particles passing through the flow cell 201 are reflected by the mirror 210a through the lens system 209. The mirror 210a reflects light having a wavelength of, for example, 470 nm or more and 850 nm or less. The 488 nm laterally scattered light reflected from the mirror 210a enters the light receiving element 214 via the lens system 211, the mirror 212, and the lens system 213. For example, lateral fluorescence of 620 nm or less is reflected by a mirror 212 that reflects light having a wavelength of 565 nm or more and 630 nm or less, and is incident on the light receiving element 215.

The light emitted from the light source 202b is applied to the flow cell 201 via the collimating lens 216, the dichroic mirror 204, and the lens system 205. The lateral fluorescence of the light derived from the particles passing through the flow cell 201 is reflected by the mirror 210b via the lens system 209. The mirror 210b transmits light having a wavelength of, for example, 470 nm or more and 645 nm or less, and reflects light having a wavelength of 665 nm or more and 850 nm or less. The lateral fluorescence reflected from the mirror 210a is collected by the lens system 217 and incident on the mirror 218. The mirror 218 transmits light having a wavelength of, for example, 470 nm or more and 730 nm or less, and reflects light having a wavelength of 750 nm or more and 850 nm or less. For example, the lateral fluorescence of 750 nm or more and 850 nm or less collected by the lens system 217 is reflected by the mirror 218 and incident on the light receiving element 219. The lateral fluorescence having a wavelength of 665 nm or more and 730 nm or less collected by the lens system 217 passes through the mirror 218 and is incident on the light receiving element 220.

In this embodiment, the flow cell 201 is a sheath flow cell. The light receiving element 208 that receives the forward scattered light uses a photodiode, and the light receiving element 214 that receives the side scattered light is an avalanche photodiode (APD). The light receiving elements 215, 219 and 220 that receive lateral fluorescence are photomultiplier tubes (PMTs). In this embodiment, the detection unit 30 includes five light receiving elements 208, 214, 215, 219 and 220. The three light receiving elements 215, 219, and 220 detect optical information of three lights having different peak wavelengths derived from the dye bonded to the particles in the sample, respectively.

The detection signals output by the light receiving elements 208, 214, 215, 219 and 220 are amplified, subjected to A/D conversion, and input to the control unit 170 (see FIG. 3).

Control Unit Details

Figure 8:
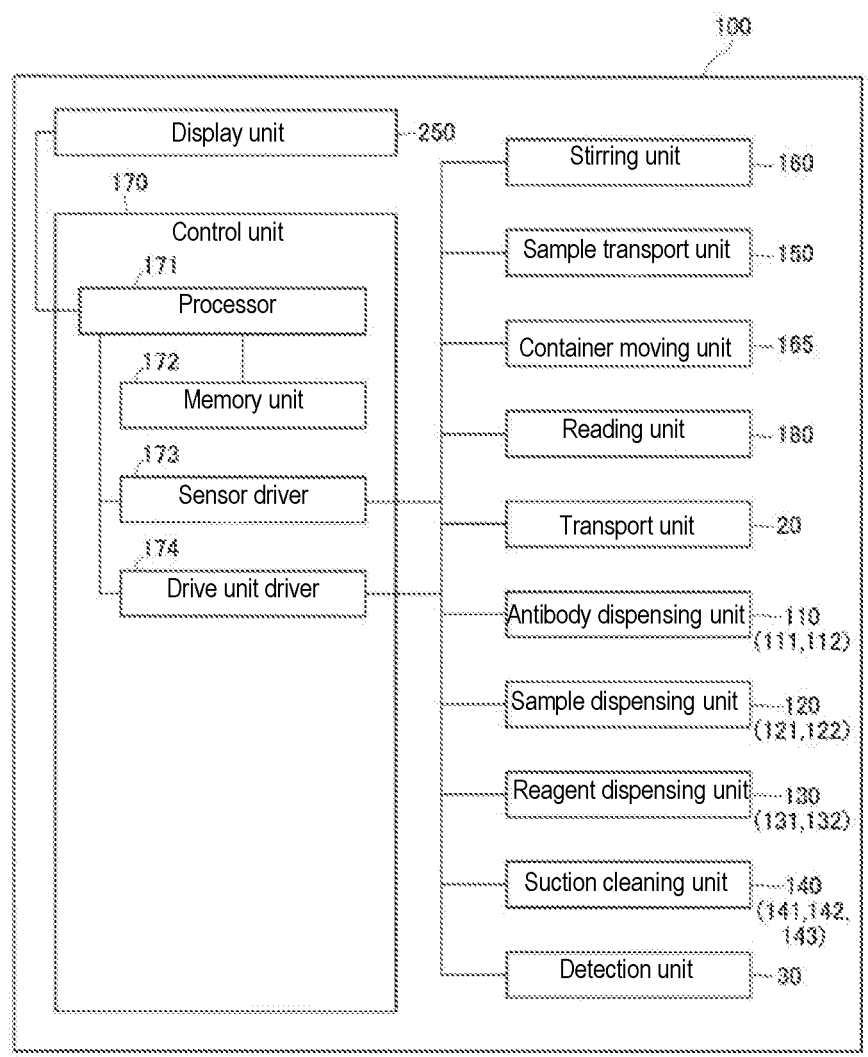
FIG. 8 is a block diagram showing a structure related to control processing of a flow cytometer.

FIG. 8 is a block diagram showing a structural example of the flow cytometer 100. The control unit 170 performs various controls by transmitting and receiving control signals to each unit of the flow cytometer 100. As shown in FIG. 8, the flow cytometer 100 includes a control unit 170, a display device 250, a stirring unit 160, a sample transfer unit 150, a container transfer unit 165, a reading unit 180, and a transfer unit 20, an antibody dispensing unit 110 including an antibody dispensing pipette moving unit 112 and an antibody dispensing pipette 111, a sample dispensing unit 120 including a sample dispensing pipette moving unit 122 and a sample dispensing pipette 121, a reagent dispensing unit 130 including a reagent dispensing pipette moving unit 132 and a reagent dispensing pipette 131, a suction and cleaning unit 140 including a suction pipette moving unit 142, a suction pipette 141, and a cleaning pipette 143, and a detection unit 30.

The control unit 170 includes a processor 171 which is a CPU, a storage unit 172, a sensor driver 173, and a drive unit driver 174. The storage unit 172 includes a ROM for storing a control program for controlling each unit of the flow cytometer 100, a RAM, and the like. The processor 171 executes arithmetic processing for functioning as the control unit 170 by executing the program stored in the storage unit 172. The control unit 170 is connected to the display device 250, and can display various information such as analysis results on the display device 250. The display device 250 is a liquid crystal display, an EL display, or the like.

The processor 171 of the control unit 170 is connected to the sensor and the drive motor of each unit of the flow cytometer 100 via the sensor driver 173 or the drive unit driver 174. The processor 171 controls the operation of the drive motor based on the detection signal from the sensor.

The control unit 170 controls the sample transport unit 150 so that the sample container 152 held in the sample rack 151 is sequentially transported to the sample take-out position P1. The control unit 170 controls the stirring unit 160 so that the sample stored in the sample container 152 held by the stirring unit 160 is stirred so as to be installed in the container transfer unit 165. The control unit 170 controls the container transfer unit 165 so as to move to a position above the sample take-out position P1, a reading position P2, and a sample suction position X12. The control unit 170 controls the reading unit 180 so as to detect the sample container 152 containing the sample. The control unit 170 acquires the sample information read from the information recording medium by the reading unit 180.

The control unit 170 controls the transport unit 20 so as to transport the reaction vessel rack 50. The control unit 170 controls the antibody dispensing unit 110 so that the antibody dispensing pipette 111 dispenses the antibody into the reaction vessel 51. The control unit 170 controls the sample dispensing unit 120 so that the sample dispensing pipette 121 dispenses the sample into the reaction vessel 51. The control unit 170 controls the reagent dispensing unit 130 so that the reagent dispensing pipette 131 dispenses the reagent into the reaction vessel 51. The control unit 170 controls the suction cleaning unit 140 so that the suction pipette 141 sucks the sample prepared from the sample and the reagent dispensed into the reaction vessel 51. The control unit 170 controls the suction cleaning unit 140 so that the cleaning pipette 143 cleans the reaction vessel 51 to which the sample is suctioned.

Operation of Flow Cytometer

Figure 9:
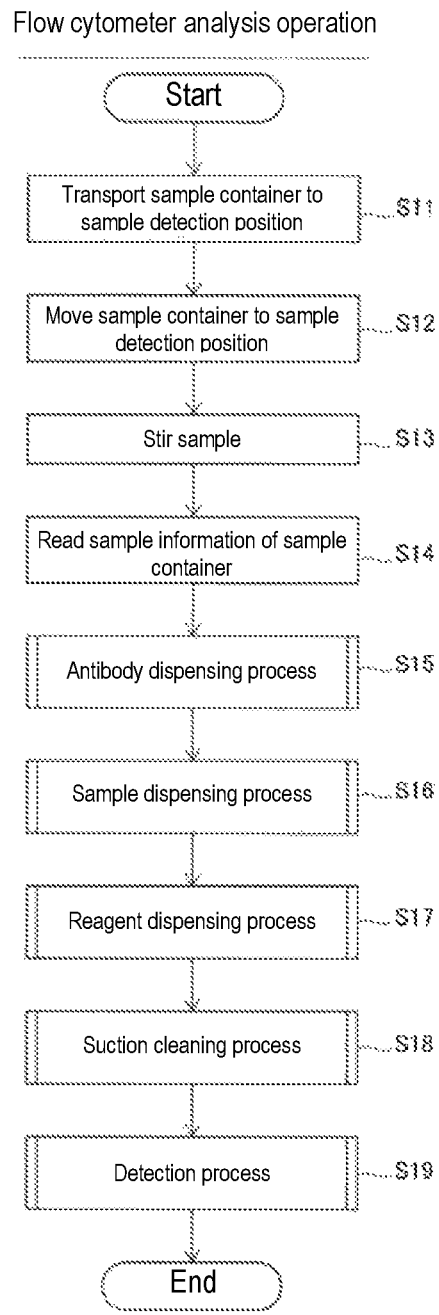
FIG. 9 is a flow chart for illustrating an analysis operation of a flow cytometer.

FIG. 9 is a flowchart showing a series of processes for executing the detection method by the flow cytometer 100. The control unit 170 shown in FIG. 8 executes a series of processes by controlling the antibody dispensing unit 110, the sample dispensing unit 120, the reagent dispensing unit 130, the suction cleaning unit 140, the transport unit 20, the detection unit 30, the sample transport unit 150, the stirring unit 160, the transfer unit 165 and the reading unit 180. Hereinafter, FIGS. 2 to 8 will be referred to for each part of the flow cytometer 100.

As preparatory work prior to the series of processing of the flow cytometer 100, the user installs a sample rack 151 holding the sample container 152 containing the sample on the sample transport unit 150. The measurement process is started when the control unit 170 receives a measurement start instruction from the user.

Figure 10:
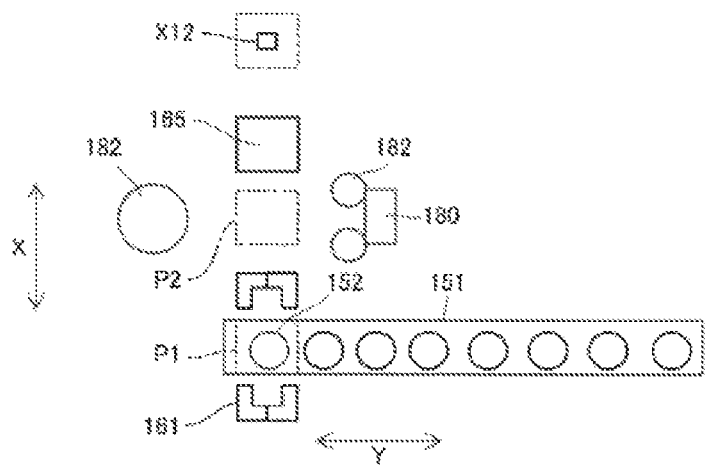
FIG. 10 is a diagram showing an operation of transporting a sample container to a sample take-out position.
Figure 11:
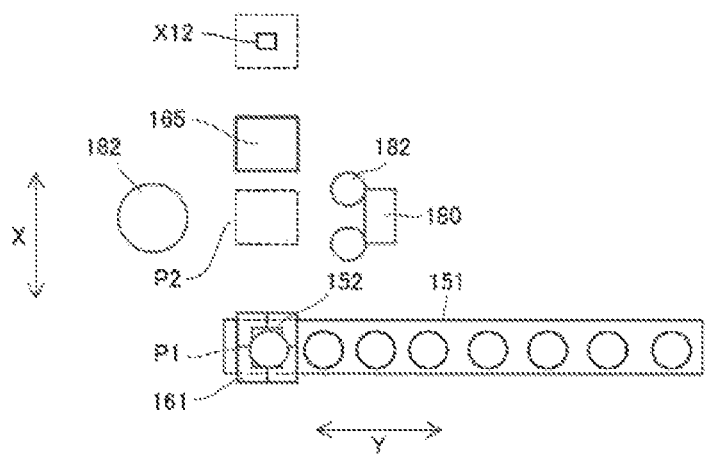
FIG. 11 is a diagram showing an operation of gripping a sample container by a stirring unit.

In step S11 of FIG. 9, the control unit 170 controls the sample transport unit 150 so as to transport the sample container 152 held in the sample rack 151 to the sample takeout position P1 (see FIG. 10). In step S12, the control unit 170 controls the stirring unit 160 so that the sample container 152 is gripped by the pair of gripping units 161 and picked up from the sample rack 151 (see FIG. 11). In step S13, the control unit 170 controls the stirring unit 160 so as to stir the sample contained in the sample container 152 by rotating the pair of gripping units 161 around the shaft 163 (see FIG. 2) while gripping the sample container 152.

Figure 12:
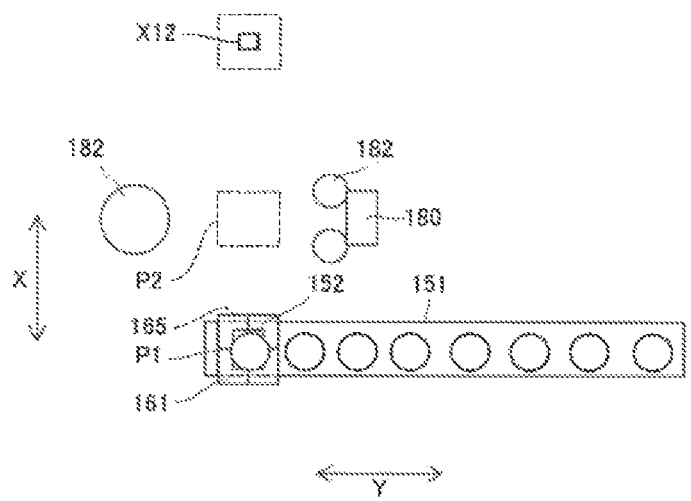
FIG. 12 is a diagram showing an operation of installing a sample container in a container transfer unit.
Figure 13:
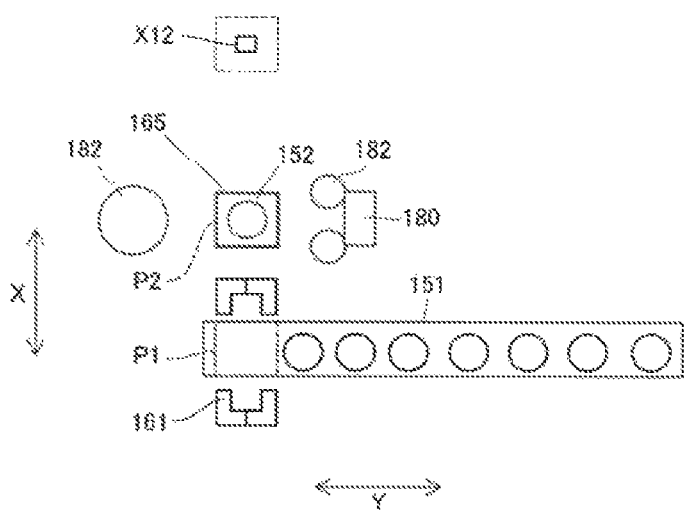
FIG. 13 is a diagram showing an operation of moving the container transfer unit to a reading position.
Figure 14:
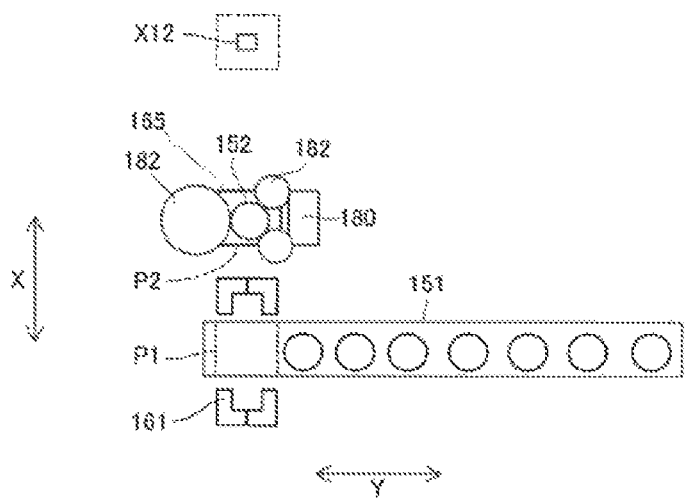
FIG. 14 is a diagram showing an operation of reading sample information by a reading unit.
Figure 15:
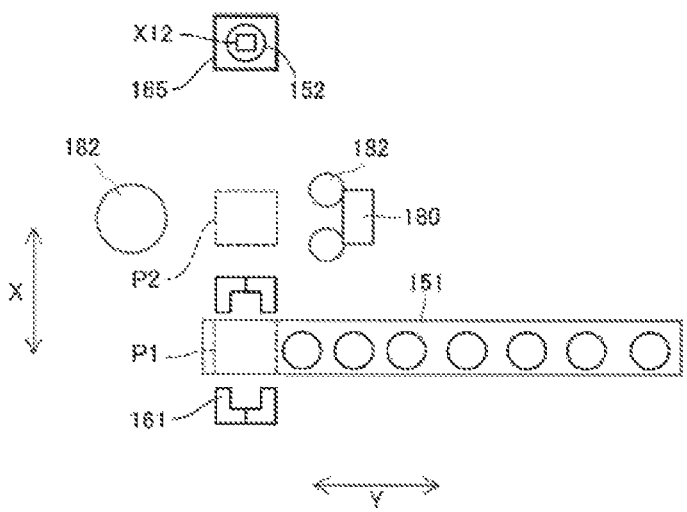
FIG. 15 is a diagram showing an operation of moving the container transfer unit to a sample suction position.

In step S14, the control unit 170 controls the reading unit 180 and the container transfer unit 165 so as to read the sample information of the sample container 152. That is, the control unit 170 controls the container transfer unit 165 and the stirring unit 160 to move the container transfer unit 165 upward from the sample take-out position P1 (see FIG. 12), and sets the container transfer unit 165 and the stirring unit 160 so that the sample container 152 is installed in the container transfer unit 165. The control unit 170 controls the container transfer unit 165 and the reading unit 180 to move the container transfer unit 165 holding the sample container 152 to the reading position P2 (see FIG. 13), and read the sample information from the information recording medium provided to the sample container 152 transported to the reading position P2 (see FIG. 14). The control unit 170 acquires the read sample information from the reading unit 180. After reading the sample information, the control unit 170 controls the container transfer unit 165 so as to move the sample container 152 to the sample suction position X12 (see FIG. 15). Note that in the sample dispensing process described later, the sample is suctioned from the sample container 152 located at the sample suction position X12.

The control unit 170 controls the antibody dispensing unit 110 and the transport unit 20 so as to execute the antibody dispensing process in step S15. In the antibody dispensing process, the antibody reagent is dispensed into one of the reaction vessels 51. The antibody is, for example, an antibody that specifically binds to an antigen possessed by a cell (white blood cell), and is a fluorescently labeled antibody labeled with a fluorescent substance. In step S16, the control unit 170 controls the sample dispensing unit 120, the transport unit 20, the stirring unit 160, and the reading unit 180 so as to execute the sample dispensing process. In the sample dispensing process, the sample in the sample container 152 is dispensed into the reaction container 51 into which the antibody has been dispensed. The sample is, for example, a whole blood sample. In step S17, the control unit 170 controls the reagent dispensing unit 130 and the transport unit 20 so as to execute the reagent dispensing process. In the reagent dispensing process, the reagent is dispensed into the reaction vessel 51 into which the antibody and the sample are dispensed. The reagent to be dispensed is, for example, a hemolytic agent. In step S18, the control unit 170 controls the suction cleaning unit 140 and the transport unit 20 so as to execute the suction cleaning process. In the suction cleaning process, the sample is suctioned from the reaction vessel 51 into which the antibody, the sample and the reagent are dispensed and sent to the detection unit 30. Then, after suctioning the sample, the reaction vessel 51 is cleaned with the cleaning liquid. In step S19, the control unit 170 controls the detection unit 30 so as to execute the detection process. In the detection process, the detection unit 30 acquires optical information about the cells in the sample, and the control unit 170 analyzes the optical information.

Antibody Dispensing Process

An example of the antibody dispensing process in step S15 of FIG. 9 will be described with reference to FIGS. 16 to 19.

In the antibody dispensing process, the control unit 170 controls the transfer unit 20 to transfer the reaction vessel 51 to the antibody dispensing position Y1 for dispensing the antibody before the sample is dispensed into the reaction vessel 51, and controls 1 the antibody dispensing pipette moving unit 112 so as to move the antibody dispensing pipette 111 to the antibody dispensing position (any of X1 to X6). In this way it is possible to prevent the antibody dispensing pipette 111 from coming into contact with the sample, so that contamination of the antibody dispensing pipette 111 can be prevented.

Figure 16:
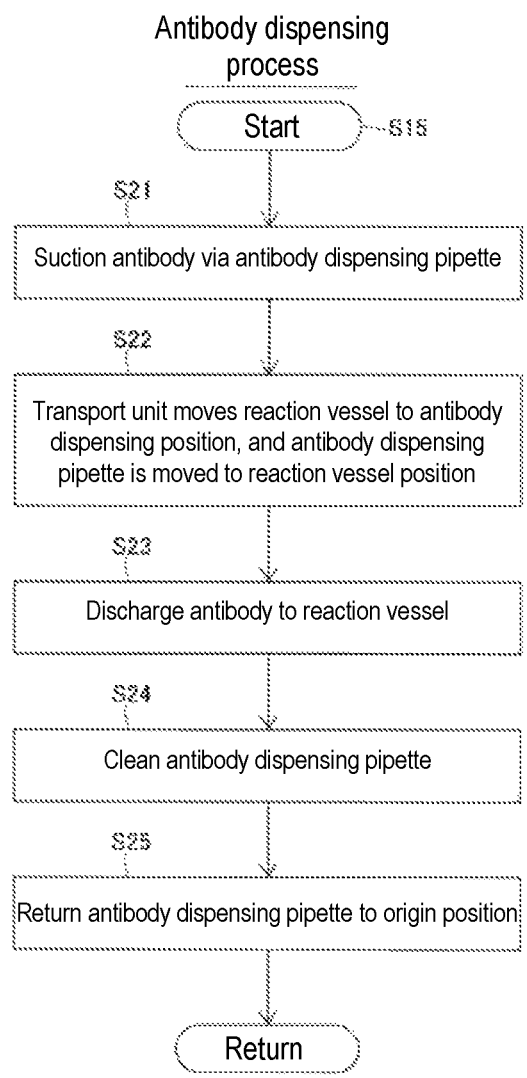
FIG. 16 is a flow chart illustrating the antibody dispensing process of FIG. 9.
Figure 17:
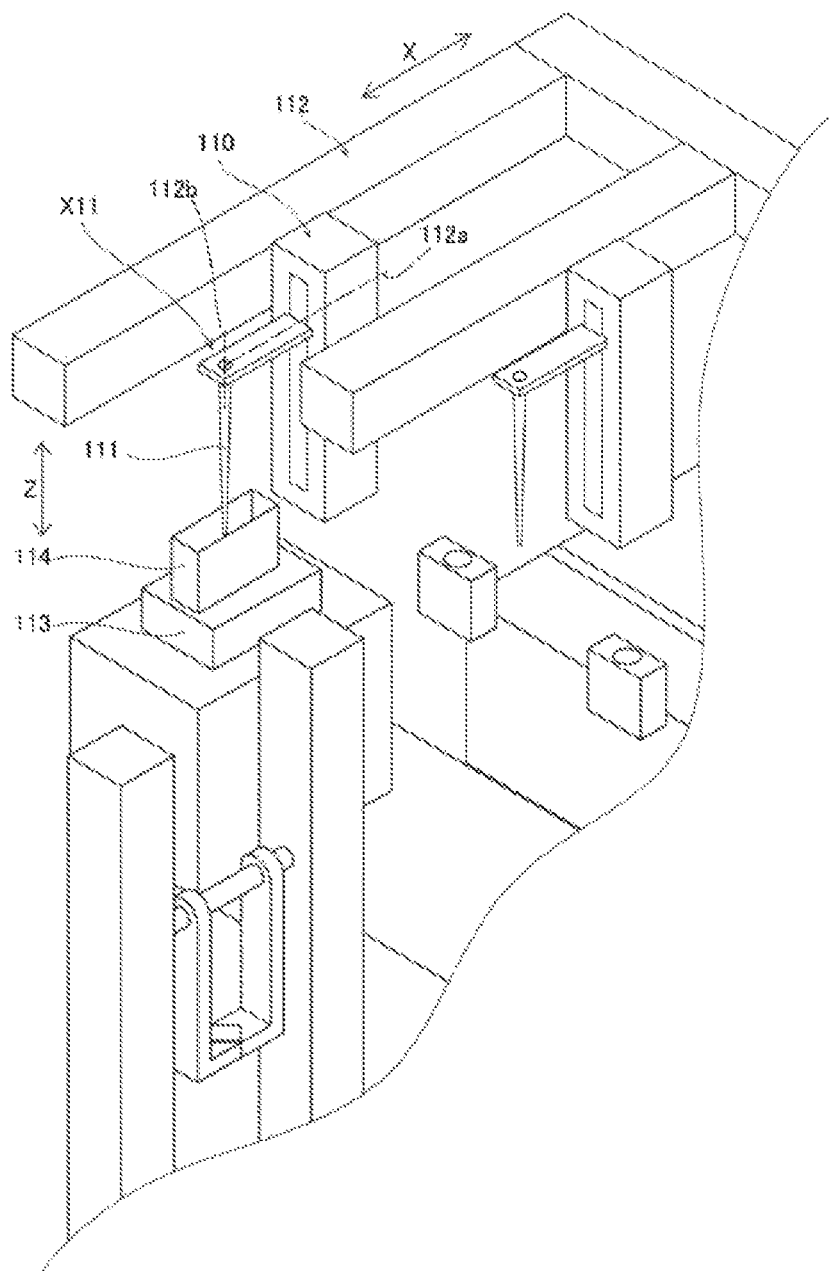
FIG. 17 is a diagram showing an antibody suction operation by an antibody dispensing pipette.
Figure 18:
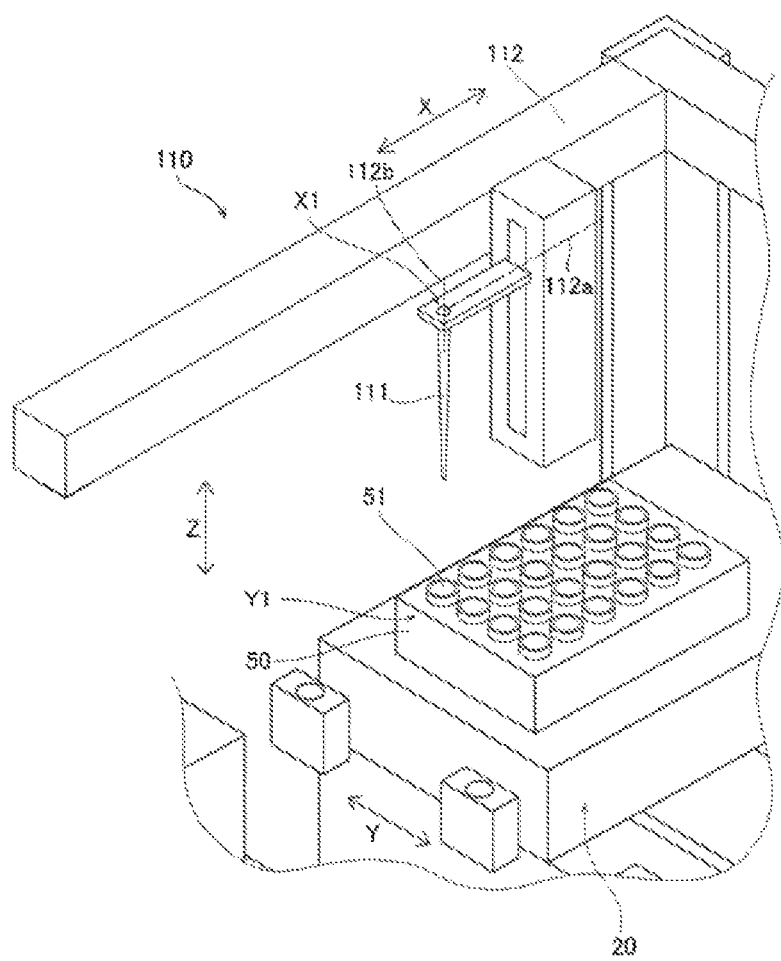
FIG. 18 is a diagram showing a state in which the antibody dispensing pipette is moved to the dispensing/suction position.
Figure 19:
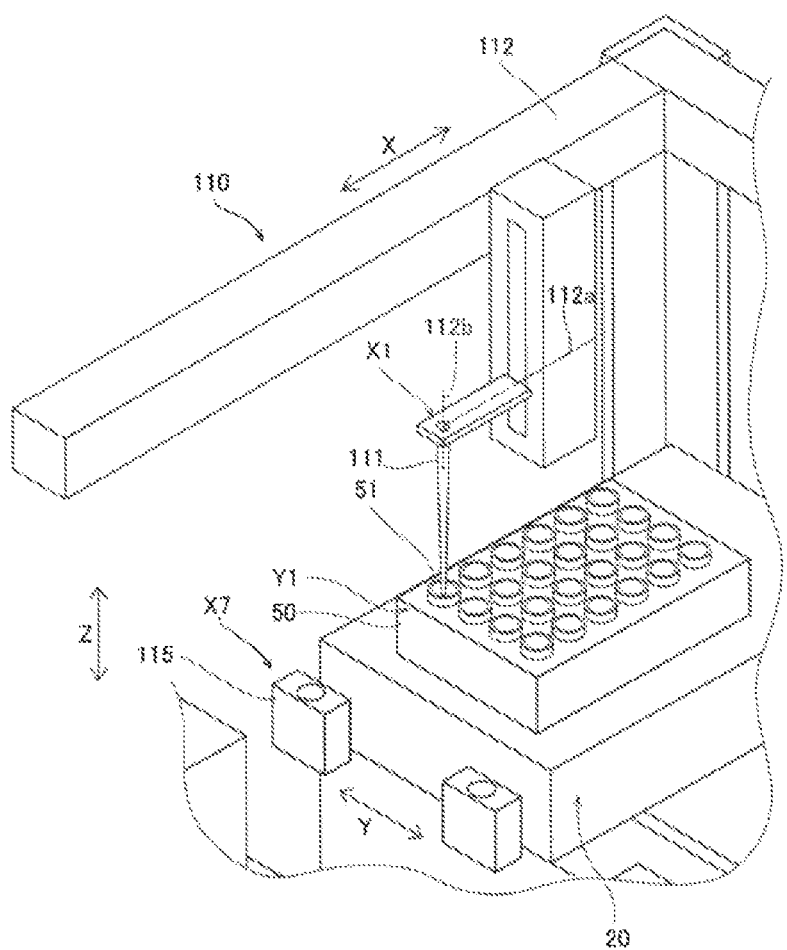
FIG. 19 is a diagram showing an antibody discharge operation by an antibody dispensing pipette.

Specifically, in step S21 of FIG. 16, the control unit 170 controls the antibody dispensing unit 110 by the antibody dispensing pipette 111 so as to suction the antibody from the antibody reagent container 114 of the antibody setting unit 113. The control unit 170 controls the antibody dispensing pipette moving unit 112 to move the antibody dispensing pipette 111 to the antibody suction position X11 along the third horizontal axis 112a, and causes the antibody dispensing pipette 111 to enter the antibody reagent container 114 along the vertical axis 112b (see FIG. 17). The control unit 170 controls the antibody dispensing unit 110 so as to suction the antibody from the antibody reagent container 114 by the antibody dispensing pipette 111, and then retract the antibody dispensing pipette 111 upward outside the antibody reagent container 114 along the vertical axis 112b.

At this time, in step S22, the control unit 170 executes the movement of the reaction vessel rack 50 by the transport unit 20 along the first horizontal axis 41, and the movement of the antibody dispensing pipette 111 along the third horizontal axis 112a. That is, the control unit 170 controls the transport unit 20 so that the reaction vessel 51 to be dispensed becomes on the third horizontal axis 112a of the antibody dispensing pipette 111 by moving the reaction vessel rack 50 along the first horizontal axis 41. The control unit 170 controls the antibody dispensing pipette moving unit 112 so as to move the antibody dispensing pipette 111 to the position at which the reaction vessel 51, which is the dispensing destination, is arranged. The control unit 170 controls the antibody dispensing pipette moving unit 112 so as to move the antibody dispensing pipette 111 to the position of the reaction vessel 51 for dispensing among the dispensing/suction positions X1 to X6 on the third horizontal axis 112a (see FIG. 18).

In step S23, the control unit 170 controls the antibody dispensing unit 110 so that the antibody dispensing pipette 111 is lowered along the vertical axis 112b, inserted into the reaction vessel 51, and the antibody is discharged into the reaction vessel 51. (See FIG. 19). After dispensing, the control unit 170 controls the antibody dispensing pipette moving unit 112 so as to retract the antibody dispensing pipette 111 upward outside the reaction vessel 51 along the vertical axis 112b.

The control unit 170 controls the antibody dispensing unit 110 so as to clean the antibody dispensing pipette 111 in step S24. The control unit 170 controls the antibody dispensing pipette moving unit 112 so as to move the antibody dispensing pipette 111 to the cleaning position X7 (see FIG. 19) of the second cleaning unit 115, lowers the antibody dispensing pipette 111 along the vertical axis 112b into the second cleaning unit 115. The control unit 170 controls the antibody dispensing pipette 111 to be cleaned by supplying the cleaning liquid into the second cleaning unit 115. After cleaning, the control unit 170 controls the antibody dispensing pipette moving unit 112 so as to retract the antibody dispensing pipette 111 upward outside the second cleaning unit 115 along the vertical axis 112b.

The control unit 170 controls the antibody dispensing pipette moving unit 112 so as to return the antibody dispensing pipette 111 to the origin position Q1 in step S25.

Sample Dispensing Process

Figure 20:
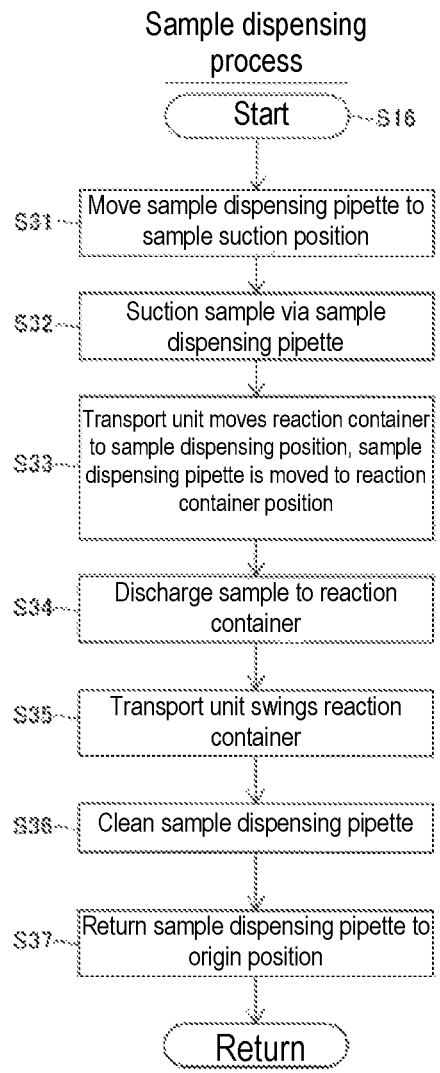
FIG. 20 is a flow chart for explaining the sample dispensing process of FIG. 9.

An example of the sample dispensing process in step S16 of FIG. 9 will be described with reference to FIGS. 20 to 22.

In the sample dispensing process, the control unit 170 controls the transport unit 20 so as to transport the reaction vessel 51 to the sample dispensing position Y2 for dispensing the sample, and controls the sample dispensing pipette moving unit 122 so as to move the sample dispensing pipette 121 to the sample dispensing position (any of X1 to X6). In this way each time the sample container 152 is detected, the sample can be sequentially dispensed into the reaction container 51.

At this time, when the sample container 152 is detected (that is, the sample information is read by the reading unit 180), the control unit 170 controls the transport unit 20 so as to transport the reaction vessel rack 50 to the sample dispensing position Y2.

Figure 21:
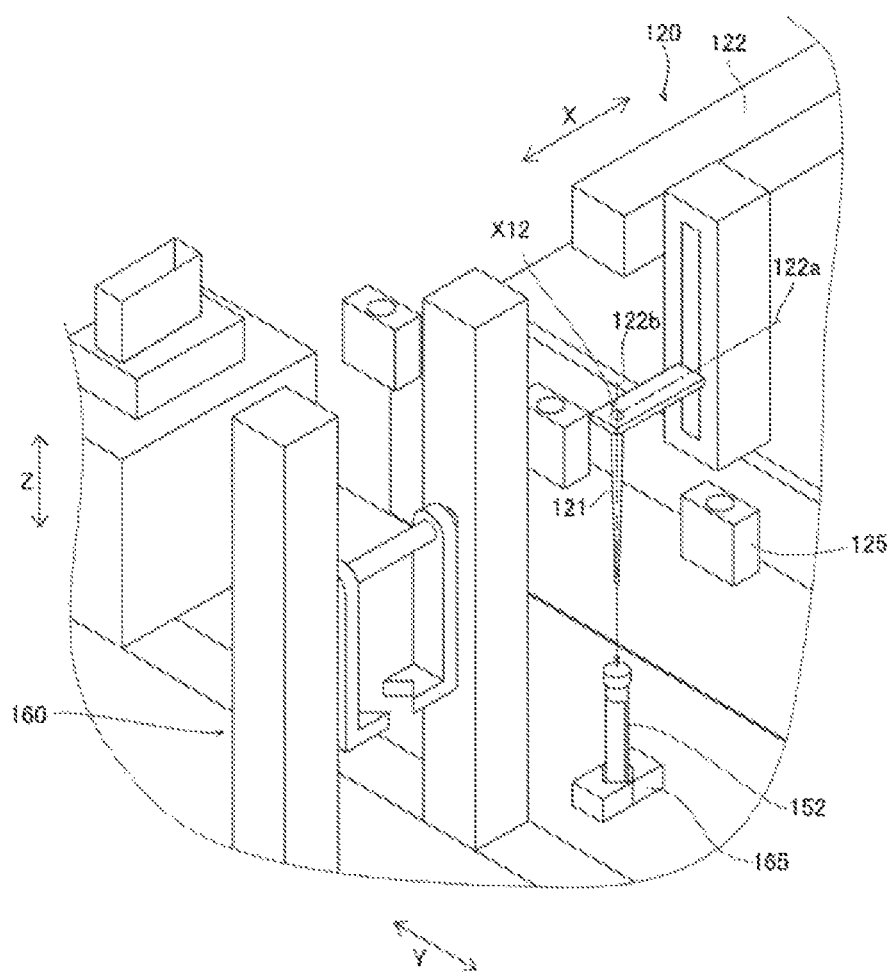
FIG. 21 is a diagram showing a sample suction operation by a sample dispensing pipette.
Figure 22:
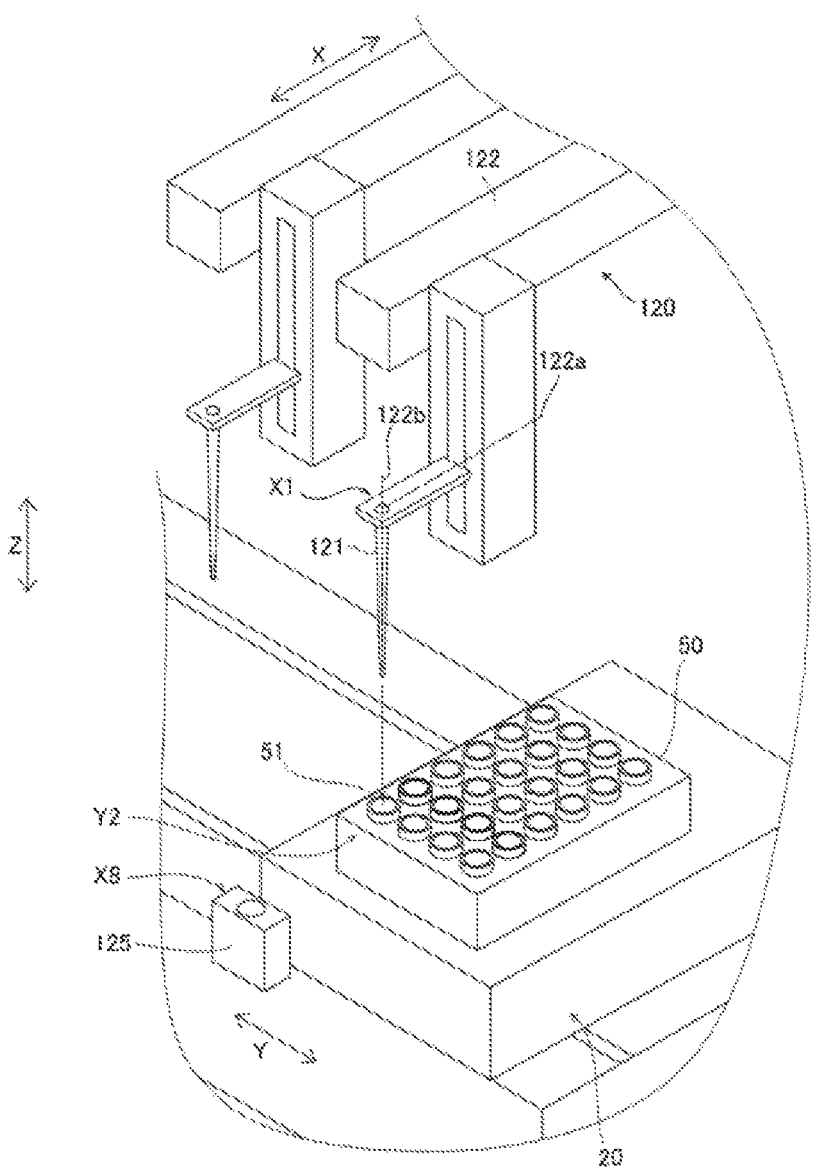
FIG. 22 is a diagram showing a sample discharge operation by a sample dispensing pipette.

In step S31, the control unit 170 controls the sample dispensing pipette moving unit 122 so as to move the sample dispensing pipette 121 to the sample suction position X12 along the second horizontal axis 122a (see FIG. 21).

In step S32, the control unit 170 controls the sample dispensing unit 120 so that the sample is suctioned from the sample container 152 by the sample dispensing pipette 121. The control unit 170 controls the sample dispensing pipette moving unit 122 so as to move the sample dispensing pipette 121 downward along the vertical axis 122b into the sample container 152 at the sample suction position X12. The control unit 170 controls the sample dispensing unit 120 so that the sample is suctioned by the sample dispensing pipette 121. After suction, the control unit 170 controls the sample dispensing pipette moving unit 122 so as to move the sample dispensing pipette 121 upward along the vertical axis 122b to the outside of the sample container 152 at the sample suction position X12.

In step S33, the control unit 170 causes the transport unit 20 to move the reaction vessel rack 50 along the first horizontal axis 41, and the sample dispensing pipette 121 to move along the second horizontal axis 122a. That is, the control unit 170 controls the transport unit 20 to move the reaction vessel rack 50 along the first horizontal axis 41 so that the reaction vessel 51 containing the antibody is disposed at the sample dispensing position Y2 on the second horizontal axis 122a of the sample dispensing pipette 121. The control unit 170 also controls the sample dispensing pipette moving unit 122 so that the sample dispensing pipette 121 is positioned at the position of the dispensing target reaction vessel 51 (dispensing/suction position X1) among the dispensing/suction positions X1 to X6 on the second horizontal axis 122a.

In step S34, the control unit 170 controls the sample dispensing unit 120 to move the sample dispensing pipette 121 downward along the vertical axis 122b so as to insert it into the reaction vessel 51, and discharges the sample into the reaction vessel 51. After dispensing, the control unit 170 controls the sample dispensing pipette moving unit 122 so as to retract the sample dispensing pipette 121 upward outside the reaction vessel 51 along the vertical axis 122b. In step S35, the control unit 170 controls the swing mechanism 23 of the transport unit 20 so as to eccentrically swing the reaction vessel rack 50. The swinging causes the antibody and the sample in the reaction vessel 51 to be agitated.

The control unit 170 controls the sample dispensing unit 120 so as to clean the sample dispensing pipette 121 in step S36. The control unit 170 controls the sample dispensing pipette moving unit 122 so as to move the sample dispensing pipette 121 to the cleaning position X8 (see FIG. 22) of the first cleaning unit 125, move the sample dispensing pipette 121 downward along the vertical axis 122b, so that the sample dispensing pipette 121 is inserted into the first cleaning unit 125. The control unit 170 controls the sample dispensing pipette 121 to be cleaned by supplying the cleaning liquid into the first cleaning unit 125. After cleaning, the control unit 170 controls the sample dispensing pipette moving unit 122 so as to retract the sample dispensing pipette 121 upward outside the first cleaning unit 125 along the vertical axis 122b.

The control unit 170 controls the sample dispensing pipette moving unit 122 so as to return the sample dispensing pipette 121 to the origin position Q2 in step S37.

Reagent Dispensing Process

An example of the reagent dispensing process in step S17 of FIG. 9 will be described with reference to FIGS. 23 and 24.

In the reagent dispensing process, the control unit 170 controls the transport unit 20 so as to transport the reaction vessel rack 50 to the reagent dispensing position Y3 for dispensing the reagent, and controls the reagent dispensing pipette moving unit 132 so as to move the reagent dispensing pipe 131 along the fifth horizontal axis 132a so as to dispense the reagent into the reaction vessel 51 containing the dispensed sample. In this way the reagent can be dispensed by the reagent dispensing pipette 131 which is different from the sample dispensing pipette 121, so that the occurrence of contamination can be suppressed.

Figure 23:
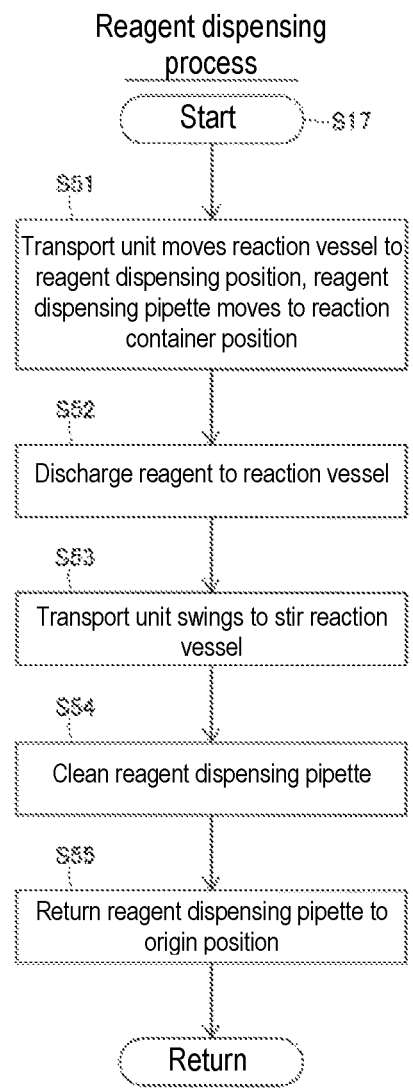
FIG. 23 is a flow chart illustrating the reagent dispensing process of FIG. 9.
Figure 24:
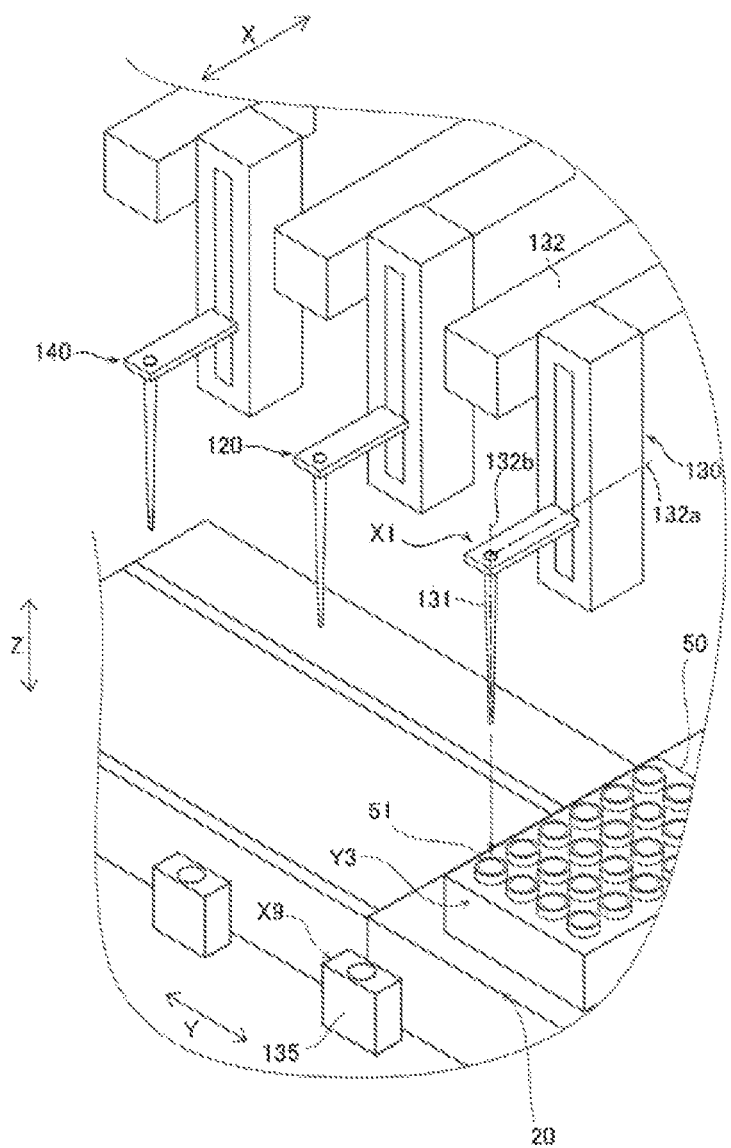
FIG. 24 is a diagram showing a reagent discharge operation by a reagent dispensing pipette.

Specifically, in step S51 of FIG. 23, the control unit 170 controls the transport unit 20 to move the reaction vessel rack 50 along the first horizontal axis 41, and move the reagent dispensing pipette 131 along the fifth horizontal axis 132a. That is, the control unit 170 controls the transport unit 20 to move the reaction vessel rack 50 along the first horizontal axis 41 so that the dispensing target reaction vessel 51 is on the fifth horizontal axis 132a of the reagent dispensing pipette 131 is disposed at the dispensing position Y3 (see FIG. 24). The control unit 170 controls the reagent dispensing pipette moving unit 132 so as to move the reagent dispensing pipette 131 to the dispensing position with respect to the reaction vessel 51 containing the antibody and the sample. The control unit 170 controls the reagent dispensing pipette moving unit 132 to position the reagent dispensing pipette 131 at the position (dispensing/suction position X1) at which the dispensing target reaction vessel 51 is located among the dispensing/suction positions X1 to X6 on the fifth horizontal axis 132a.

In step S52, the control unit 170 controls the reagent dispensing unit 130 so that the reagent dispensing pipette 131 is lowered along the vertical axis 132b, inserted into the reaction vessel 51, and the reagent is discharged into the reaction vessel 51. After dispensing, the control unit 170 controls the reagent dispensing pipette moving unit 132 so as to retract the reagent dispensing pipette 131 upward outside the reaction vessel 51 along the vertical axis 132b.

In step S53, the control unit 170 controls the swing mechanism 23 of the transport unit 20 so as to eccentrically swing the reaction vessel rack 50. The swinging causes the antibody, sample, and reagent in the reaction vessel 51 to be agitated.

The control unit 170 controls the reagent dispensing unit 130 so as to wash the reagent dispensing pipette 131 in step S54. The control unit 170 controls the reagent dispensing pipette moving unit 132 so as to move the reagent dispensing pipette 131 to the cleaning position X9 (see FIG. 24) of the third cleaning unit 135, lower the reagent dispensing pipette 131 along the vertical axis 132b and into the third cleaning unit 135. The control unit 170 controls the reagent dispensing pipette 131 to be cleaned by supplying the cleaning liquid into the third cleaning unit 135. After cleaning, the control unit 170 controls the reagent dispensing pipette moving unit 132 so as to retract the reagent dispensing pipette 131 upward outside the third cleaning unit 135 along the vertical axis 132b.

The control unit 170 controls the reagent dispensing pipette moving unit 132 so as to return the reagent dispensing pipette 131 to the origin position Q3 in step S55.

Suction Cleaning Process

An example of the suction cleaning process in step S18 of FIG. 9 will be described with reference to FIGS. 25 and 26.

Figure 25:
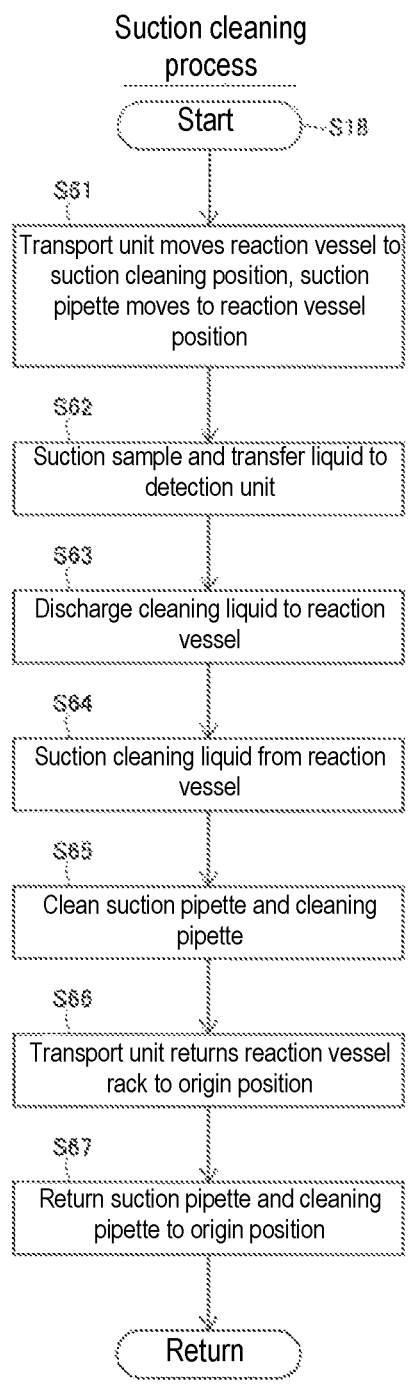
FIG. 25 is a flow chart illustrating the suction cleaning process of FIG. 9.
Figure 26:
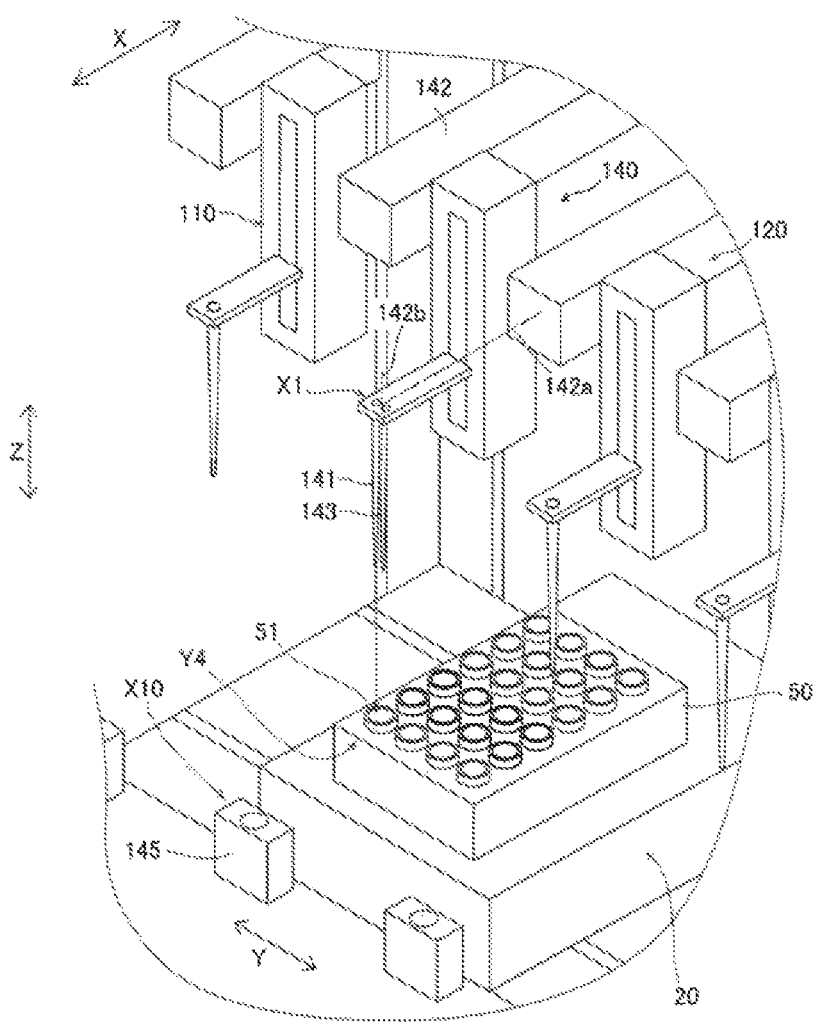
FIG. 26 is a diagram showing a suction operation of a sample by a suction pipette.

In step S61 of FIG. 25, the control unit 170 controls the transport unit 20 to move the reaction vessel rack 50 along the first horizontal axis 41, and move the suction pipette 141 and the cleaning pipette 143 along the fourth horizontal axis 142a. That is, the control unit 170 controls the transport unit 20 to move the reaction vessel rack 50 along the first horizontal axis 41 so that the dispensing target reaction vessel 51 is positioned at the suction/cleaning position Y4 on the fourth horizontal axis 142a of the suction pipette 141 and the cleaning pipette 143 (see FIG. 26). The control unit 170 controls the suction pipette moving unit 142 to move the suction pipette 141 and the cleaning pipette 143 to the positions (dispensing/suction position X1) where the reaction vessel 51 to be dispensed is located among the dispensing/suction positions X1 to X6 on the fourth horizontal axis 142a. In this way the suction pipette 141 and the cleaning pipette 143 are positioned at the suction positions with respect to the reaction vessel 51 containing the antibody, the sample, and the reagent.

In step S62, the control unit 170 controls the suction cleaning unit 140 so that the suction pipette 141 and the cleaning pipette 143 are lowered along the vertical axis 142b and the sample is suctioned from the reaction vessel 51 by the suction pipette 141. The control unit 170 controls the suction cleaning unit 140 so as to send the sample suctioned by the suction pipette 141 to the detection unit 30.

In step S63, the control unit 170 controls the suction cleaning unit 140 so that the cleaning liquid is discharged from the cleaning pipette 143 into the reaction vessel 51. In step S64, the control unit 170 controls the suction cleaning unit 140 so that the cleaning liquid in the reaction vessel 51 is suctioned by the cleaning pipette 143. After suctioning the cleaning liquid, the control unit 170 controls the suction pipette moving unit 142 so as to retract the suction pipette 141 and the cleaning pipette 143 upward outside the reaction vessel 51 along the vertical axis 142b.

The control unit 170 controls the transport unit 20 so as to return the reaction vessel rack 50 to the origin position Y0 (see FIG. 6) in step S65.

The control unit 170 controls the suction cleaning unit 140 so as to clean the suction pipette 141 and the cleaning pipette 143 in step S66. The control unit 170 controls the suction pipette moving unit 142 so as to move the suction pipette 141 and the cleaning pipette 143 to the cleaning position X10 (see FIG. 26) of the fourth cleaning unit 145 along the fourth horizontal axis 142a, so that the suction pipette 141 and the cleaning pipette 143 are moved downward along the vertical axis 142*b* and inserted into the fourth cleaning unit 145. The control unit 170 performs controls to clean the suction pipette 141 and the cleaning pipette 143 by supplying the cleaning liquid into the fourth cleaning unit 145. After cleaning, the control unit 170 controls the suction pipette moving unit 142 so that the suction pipette 141 and the cleaning pipette 143 are retracted upward outside the fourth cleaning unit 145 along the vertical axis 142*b*.

The control unit 170 controls the suction pipette moving unit 142 so as to return the suction pipette 141 and the washing pipette 143 to the origin position Q4 in step S67.

Detection Process

Figure 27:
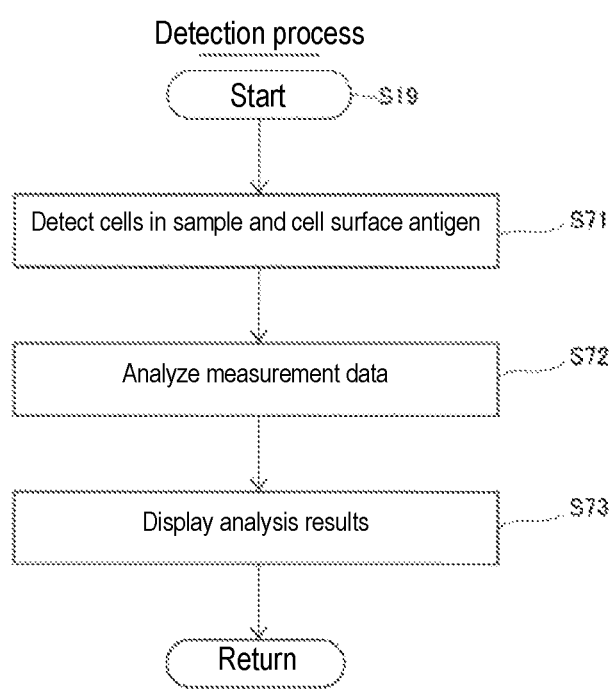
FIG. 27 is a flow chart illustrating the detection process of FIG. 9.

An example of the detection process in step S19 of FIG. 9 will be described with reference to FIG. 27.

In step S71, the control unit 170 controls the detection unit 30 so as to optically detect the detection target (cell surface antigen that reacts with the antibody contained in the cell and the antibody reagent) in the sample. The control unit 170 acquires measurement data based on the forward scattered light, the side scattered light, and the side fluorescence from the detection unit 30. The measurement data includes, for example, scattered light intensity information that reflects the size of the cell, and fluorescence intensity information that reflects the presence or absence of binding between the antigen and the antibody on the cell surface.

In step S72, the control unit 170 analyzes the measurement data received from the control unit 170. The control unit 170 calculates, for example, the total number of cells in the sample, the number of positive cells bound to the antibody, the number of negative cells not bound to the antibody, and the like from the measurement data of individual cells. In step S73, the control unit 170 outputs the analysis result of the measurement data to the display device 250 and displays it on the screen.

As described above, the analysis process (particle analysis method) of the flow cytometer 100 is completed.

Here, the flow of the analysis process for the sample in one sample container 152 held in the sample rack 151 (see FIG. 2) has been described. The flow cytometer 100 sequentially analyzes the plurality of sample containers 152 held in the sample rack 151 one by one.

Then, in the transporting step of the present embodiment, the reaction vessel rack 50 is sequentially transported to the sample dispensing position Y2 and the reagent dispensing position (Y1, Y3), respectively. In the step of dispensing the sample, the sample dispensing pipette 121 is moved to each sample dispensing position (X1 to X6), and the sample is dispensed into the reaction vessel 51 located at each sample dispensing position. In the step of dispensing reagents, the reagent dispensing pipettes (antibody dispensing pipette 111, reagent dispensing pipette 131) are moved to each reagent dispensing position (X1 to X6), and the reagent is dispensed into the reaction container 51 disposed at each reagent dispensing position.

When there are a plurality of samples to be measured, the control unit 170 performs controls to execute the analysis processing operation of each sample in parallel in consideration of the reaction time of each sample. That is, the control unit 170 controls the processing timing for a plurality of samples so that the timing of the dispensing/suction operation by the pipette and the transfer timing of the reaction vessel rack 50 do not overlap.

Figure 28:
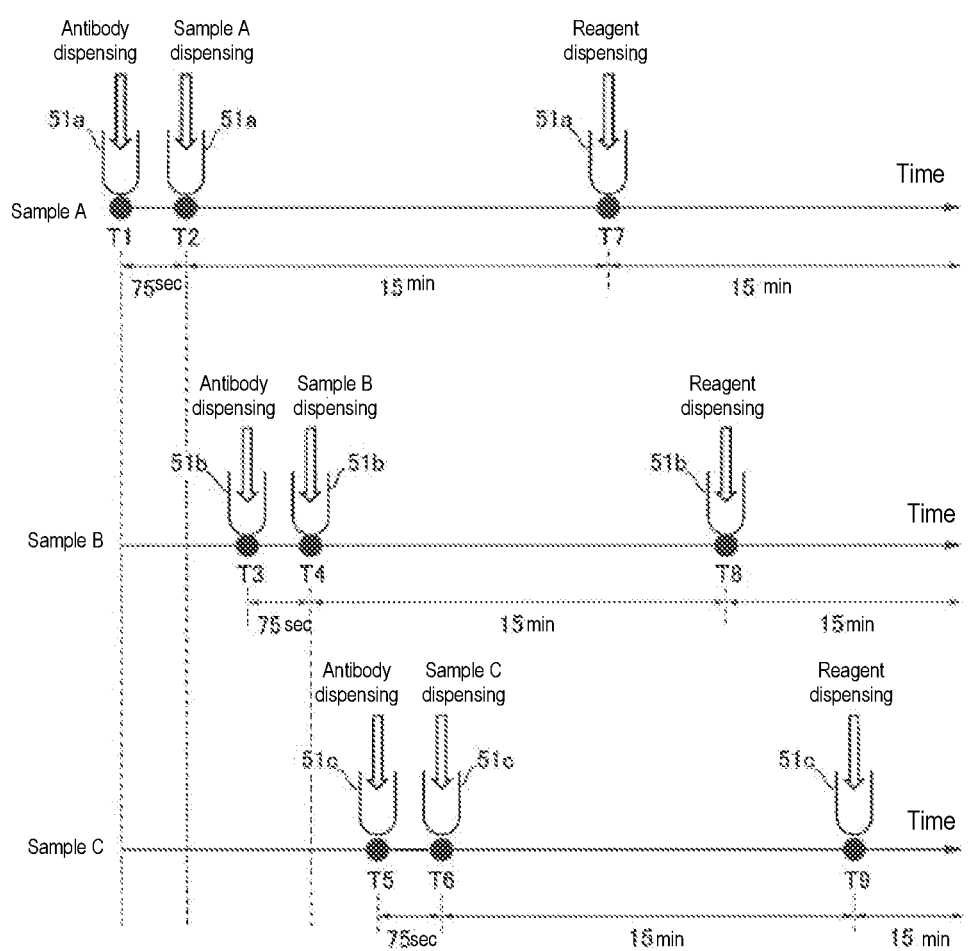
FIG. 28 is a timing chart showing a flow of sample processing for a plurality of samples.

With reference to FIG. 28, an example of processing timing when each process is executed on, for example, three samples (sample A, sample B, and sample C) will be described.

The control unit 170 (see FIG. 8) executes the antibody dispensing process in the first reaction vessel 51*a* at time T1. Next, the control unit 170 executes a sample dispensing process for dispensing the first sample A into the first reaction vessel 51*a*, for example, at time T2 after a lapse of a predetermined period (for example, 75 seconds) from time T1. At time T1 and time T2, the antibody dispensing unit 110, the sample dispensing unit 120, and the transporting unit 20 are controlled so as to execute the antibody dispensing process and the sample dispensing process for the first sample A.

The control unit 170 reacts the antibody and the sample A contained in the first reaction vessel 51*a* from the time T2 to the time T7 after a predetermined period (for example, 15 minutes) has elapsed. During this time, each dispensing unit and the transporting unit 20 can perform another sample processing operation. The control unit 170 starts the controls of the analysis process operation of the sample B and the sample C during the time for reacting the antibody and the sample A contained in the first reaction vessel 51*a*, that is, between the time T2 and the time T7.

The control unit 170 executes the antibody dispensing process in the second reaction vessel 51*b* at time T3. Next, the control unit 170 executes a sample dispensing process for dispensing the sample B into the second reaction vessel 51*b* at time T4. At time T3 and time T4, the antibody dispensing unit 110, the sample dispensing unit 120, and the transport unit 20 are controlled so as to execute the antibody dispensing process and the sample dispensing process for the sample B. The control unit 170 reacts the antibody and the sample B contained in the second reaction vessel 51*b* from the time T4 to the time T8 after a predetermined period (for example, 15 minutes) has elapsed.

The control unit 170 executes the antibody dispensing treatment in the third reaction vessel 51*c* at time T5. Next, the control unit 170 executes a sample dispensing process for dispensing the sample C into the third reaction vessel 51*c* at time T6. The control unit 170 reacts the antibody and the sample C contained in the third reaction vessel 51*c* from the time T6 to the time T9 after a predetermined period (for example, 15 minutes) has elapsed.

The control unit 170 executes the reagent dispensing process for the first reaction vessel 51*a* at the time T7 when the reaction between the antibody and the sample A contained in the first reaction vessel 51*a* is completed. The control unit 170 reacts the sample A contained in the first reaction vessel 51*a* with the reagent for a predetermined period (for example, 15 minutes) from the time T7. Then, the sample contained in the first reaction vessel 51*a* is suctioned by the suction pipette 141, and the liquid is sent to the detection unit 30. The detection unit 30 detects a detection target in the sent sample. Similarly, the control unit 170 executes the reagent dispensing process for the second reaction vessel 51*b* at the time T8 when the reaction between the antibody and the sample B contained in the second reaction vessel 51*b* is completed. The control unit 170 reacts the sample B contained in the second reaction vessel 51*b* with the reagent for a predetermined period from time T8. Then, the sample contained in the second reaction vessel 51*b* is suctioned by the suction pipette 141 and sent to the detection unit 30. The detection unit 30 detects a detection target in the sent sample. The control unit 170 executes the reagent dispensing process for the third reaction vessel 51*c* at the time T9 when the reaction between the antibody and the sample C contained in the third reaction vessel 51*c* is completed. The control unit 170 reacts the sample contained in the third reaction vessel 51*c* with the reagent for a predetermined period from time T9. Then, the sample contained in the third reaction vessel 51c is suctioned by the suction pipette 141 and sent to the detection unit 30. The detection unit 30 detects a detection target in the sent sample.

In this way, the control unit 170 controls to execute the dispensing/suction process operation for a plurality of samples by utilizing the reaction time other than the dispensing/suction processing in the analysis processing of each sample. The control unit 170 also performs the subsequent suction cleaning process for each of the samples A, B, and C at different timings. In this way even when there are a plurality of samples to be measured, the analysis processing operation for each sample can be performed in parallel, and as a result, the processing efficiency of the sample analyzer can be improved.

The above embodiment is suitable for an apparatus in which a pretreatment step of mixing a sample and a reagent and a detection step of the detection unit 30 are integrally performed. That is, while it is difficult to realize miniaturization with a conventional device that combines a general-purpose pretreatment device and a detection device, in the present embodiment, the pretreatment device and the detection device are integrated such that rendering the device more compact is readily accomplished. Further, since the pretreatment step and the detection step can be carried out as a series of processes, the processing efficiency is improved.

Modification Examples

Note that the embodiments disclosed herein are exemplary in all respects and are not considered to be restrictive. The scope of the present invention is shown by the scope of claims rather than the description of the above-described embodiment, and further includes all modifications (modifications) within the meaning and scope equivalent to the scope of claims.

For example, each unit (for example, antibody dispensing unit 110, sample dispensing unit 120, reagent dispensing unit 130, and suction cleaning unit 140) may be arranged along the first horizontal axis 41, although the arrangement of each unit is not limited to the arrangement shown in FIG. 2.

Figure 29:
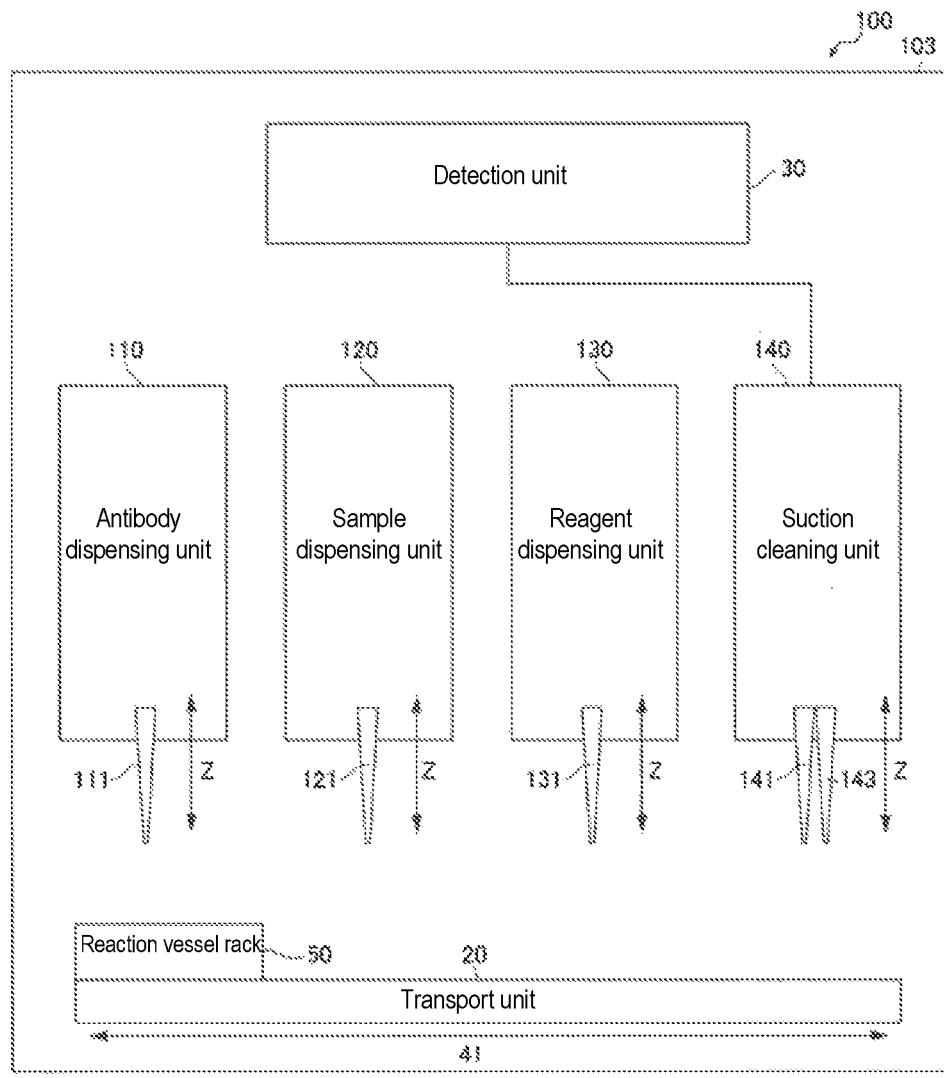
FIG. 29 is a schematic view showing the arrangement of a dispensing/suction unit according to a modified example.

For example, as shown in FIG. 29, from the left side in FIG. 29, the antibody dispensing unit 110 (antibody dispensing pipette 111), the sample dispensing unit 120 (sample dispensing pipette 121), and the reagent dispensing unit 130 (reagent dispensing pipette 131), and the suction cleaning unit 140 (suction pipette 141 and cleaning pipette 143) may be arranged in this order.

In the above embodiment, as an example of the "first axis", the "second axis" and the "third axis", the first horizontal axis 41, the second horizontal axis 42 (122a), and the third horizontal axis 43 (112a) are described, although the present invention is not limited to this. The first axis may be a horizontal axis. Both the second axis and the third axis do not have to be horizontal axes, and may be axes inclined in the vertical direction. Similarly, as an example of the "fourth axis" and the "fifth axis", the fourth horizontal axis 142a and the fifth horizontal axis 132a are shown, however, neither the fourth axis nor the fifth axis need be a horizontal axis and may be an axis inclined in the vertical direction.

Further, in the above embodiment, the first horizontal axis 41 has been described as being an axis parallel to the Y-axis. However, the present invention is not limited to this. For example, the first horizontal axis 41 may be an axis parallel to the X-axis. In this case, the second horizontal axis and the third horizontal axis may be axes parallel to the Y-axis. The first horizontal axis 41 and the second horizontal axis and the third horizontal axis do not have to be orthogonal to each other and may intersect at a constant angle. The second horizontal axis and the third horizontal axis do not have to be parallel, and the extension line of the second horizontal axis and the extension line of the third horizontal axis may intersect. The second horizontal axis and the third horizontal axis may intersect, in which case the pipette moving unit may be controlled so that when one of the sample dispensing pipette and the reagent dispensing pipette passes through the intersection, the other is retracted from the intersection.

In the above embodiment, the flow cytometer 100 shows an example in which each pipette is provided with a separate cleaning section, but the present invention is not limited thereto. For example, the flow cytometer 100 may include a cleaning unit that is also used for cleaning each pipette. That is, the flow cytometer 100 may include a single cleaning unit capable of cleaning all of the antibody dispensing pipette 111, the sample dispensing pipette 121, the reagent dispensing pipette 131, and the suction pipette 141. The flow cytometer 100 also may include a cleaning unit used for one pipette and a cleaning unit that is also used for a plurality of other pipettes. For example, the flow cytometer 100 may include a cleaning unit for cleaning the sample dispensing pipette 121, and a cleaning unit for cleaning the antibody dispensing pipette 111, the reagent dispensing pipette 131, and the suction pipette 141. The flow cytometer 100 is provided with a sample-dedicated cleaning unit for cleaning the sample dispensing pipette 121 that dispenses the sample to be analyzed, thereby effectively suppressing contamination of the sample that directly affects the analysis result.

In the above embodiment, the light (scattered light, fluorescence) emitted from the particles when irradiated with a predetermined light is collectively referred to as the light derived from the particles, but the present invention is not limited to this. For example, the light derived from the particles may be the light emitted by the substance itself contained in the particles.

In the above embodiment, the detection unit 30 shown in FIG. 7 includes a single mirror 212 and a light receiving element 215 for detecting lateral fluorescence of 565 nm or more and 630 nm or less, but the present invention is not limited thereto. For example, the detection unit 30 also may include a plurality of each of the mirror 212 and the light receiving element 215. For example, the detection unit 30 may further include a mirror that reflects lateral fluorescence having a wavelength of 512 nm or more and 570 nm or less, and a light receiving element that receives the lateral fluorescence reflected from the mirror.

In the above embodiment, the detection unit 30 includes three light receiving elements 215, 219 and 220 for detecting lateral fluorescence, but the present invention is not limited thereto. The detection unit 30 also may include one, two, or four or more light receiving elements for fluorescence detection. The detection unit 30 includes three or more light receiving elements, and it is preferable that at least two or more light receiving elements among the three or more light receiving elements detect optical information of light derived from at least two dyes having different peak wavelengths.

In the above embodiment, the detection unit 30 includes two light sources 202a and 202b, but the present invention is not limited thereto. For example, the number of light sources may be one or three or more. The light source is selected according to the wavelength region of the light derived from the dye bound to the particles. When there are two or more light sources, these light sources preferably emit light having different peak wavelengths. When the number of light sources is two or more, it is preferable that a plurality of fluorescence can be separated and detected with higher accuracy than when the number of light sources is one. By using a dye suitable for the peak wavelength of the light from each light source, it is possible to reduce the overlapping portion of each wavelength region of the plurality of fluorescences.

Although the control unit 170 is implemented by, for example, a software program executed by a processor in the above embodiment, the present invention is not limited thereto. The control unit 170 also may be realized by a logic circuit (hardware) formed in an integrated circuit (IC chip) or the like. The program also may be downloaded and provided from the outside of the flow cytometer 100 via a network, or may be provided by a non-transient information recording medium that can be read by a computer such as a semiconductor memory, a CD-ROM or a DVD-ROM.

In the above embodiment, the control unit 170 has a function of controlling the operation of each unit included in the flow cytometer 100 and a function of performing data analysis based on the optical information of the detection unit 30, however, the present invention is not limited to this. The control unit 170 also may have only a function of controlling the operation of each unit included in the flow cytometer 100, and the flow cytometer 100 may include a data processing unit for data analysis separately from the control unit 170. In this case, the data processing unit acquires the measurement data based on the optical information of the detection unit 30 from the control unit 170, and performs the data analysis process shown in step S72 of FIG. 27. The flow cytometer 100 also does not have to include a data processing unit. In this case, the control unit 170 of the flow cytometer 100 may be connected to an external data processing device that performs data processing and may be configured to transmit measurement data to the data processing device. Both the data processing unit and the data processing device are composed of a computer equipped with a computing device such as a processor and volatile and non-volatile storage devices, such that the computing device executes a software program for analyzing measurement data.

In the above embodiment, as shown in FIG. 2, the suction cleaning unit 140 includes an suction pipette 141 and a cleaning pipette 143, but the present invention is not limited thereto. For example, the suction cleaning unit 140 also may include a single pipette having both a sample suction function and a reaction vessel 51 cleaning function. Further, a suction unit having a single suction pipette and a washing unit having a single washing pipette may be provided separately.

In the above embodiment, an example (see FIG. 6) in which the reaction vessel rack 50 holds the reaction vessel 51 in a grid pattern (matrix) is shown, however the present invention is not limited thereto. The reaction vessel rack 50 may hold the reaction vessel 51 in an arrangement mode other than the grid pattern, and the arrangement of the reaction vessels 51 is arbitrary. The reaction vessel rack 50 may hold the reaction vessels 51 at non-equal intervals, or may hold a large number of reaction vessels 51 in only some rows or some columns. The reaction vessel rack 50 preferably holds the reaction vessel 51 side by side along the second horizontal axis and the third horizontal axis. With the reaction vessel rack 50 located at one location, the pipette can perform dispensing/suction operations to a plurality of reaction vessels 51 simply by moving along the second horizontal axis and the third horizontal axis, thus improving processing efficiency.

In the above embodiment, an example in which the reaction vessel rack 50 can hold a total of 24 reaction vessels 51 is shown, but the present invention is not limited to this. The reaction vessel rack 50 may be capable of holding a plurality of reaction vessels 51, and may be capable of holding 2 to 23 or 25 or more reaction vessels 51.

The above embodiment shows an example in which the position of each pipette (antibody dispensing pipette 111, sample dispensing pipette 121, reagent dispensing pipette 131, suction pipette 141 and washing pipette 143) is controlled by the feed amount per pulse of the motor 191$a$ and the motor 192$a$, and the origin position detected by the origin sensors 194 and 195. The position control of the pipette may be performed based on each axial position of the pipette detected by the linear encoder, or may be performed based on the rotation angle of the motor detected by the rotary encoder.

In the above embodiment, an example in which the sample is blood is shown, but the present invention is not limited to this. The sample may be, for example, urine, tissue fluid of the subject, a suspension of cells collected from the subject, or the like other than blood. The subject is mainly human, but may be an animal other than human.

In the above embodiment, an antibody and a hemolytic agent have been exemplified as reagents to be dispensed by the pipette, but the present invention is not limited to this. Reagents also may be reagents other than antibodies and hemolytic agents. The reagent may be, for example, a staining solution for staining cell nuclei.

Note that the embodiments disclosed herein are exemplary in all respects and are not considered to be restrictive. The scope of the present invention is shown by the scope of claims rather than the description of the above-described embodiment, and further includes all modifications within the meaning and scope equivalent to the scope of claims.

What is claimed is:

1. A detection method comprising:
   transporting a rack holding a reaction vessel along a first axis toward a sample dispensing position;
   linearly moving the sample dispensing pipette above the rack along a second axis intersecting the first axis in a top view, and dispensing a sample into the reaction vessel located at the sample dispensing position;
   transporting the rack along the first axis toward a reagent dispensing position;
   linearly moving a reagent dispensing pipette above the rack along a third axis intersecting the first axis in a top view, and dispensing a reagent into the reaction vessel located at the reagent dispensing position;
   swinging the rack in a horizontal plane; and
   detecting a detection target in a measurement specimen prepared from the sample and the reagent.

2. The detection method according to claim 1, wherein the rack holds a plurality of reaction vessels in a direction intersecting the first axis;
   the dispensing the sample comprises:
      linearly moving the sample dispensing pipette along the second axis and dispensing a first sample into a first reaction vessel located at the sample dispensing position; and
      linearly moving the sample dispensing pipette along the second axis and dispensing a second sample into a second reaction vessel located at a sample dispensing position different from the aforesaid sample dispensing position;

the dispensing the reagent comprises:
- linearly moving the reagent dispensing pipette along the third axis and dispensing the reagent into the first reaction vessel located at the reagent dispensing position; and
- linearly moving the reagent dispensing pipette along the third axis and dispensing the reagent into the second reaction vessel located at a reagent dispensing position different from the aforesaid reagent dispensing position.

3. The detection method according to claim 2, wherein the dispensing the second sample and the dispensing the reagent to the second reaction vessel are executed after the dispensing the first sample and the dispensing the reagent to the first reaction vessel are executed; and subsequently the detecting the detection target in the measurement specimen prepared from the first sample and the reagent is executed.

4. The detection method according to claim 1, wherein the second axis and the third axis are parallel to each other.

5. The detection method according to claim 1, wherein the first axis and at least one of the second axis and the third axis are orthogonal to each other.

6. The detection method according to claim 1, further comprising:
- transporting the rack along the first axis toward a suction position for suctioning the measurement specimen from the reaction vessel into which the sample and the reagent are dispensed; and
- linearly moving a suction pipette above the rack along a fourth axis intersecting the first axis and suctioning the measurement specimen from the reaction vessel located at the suction position,
- wherein, in the detecting the detection target, the detection target in the measurement specimen suctioned from the reaction vessel by the suction pipette is detected.

7. The detection method according to claim 6, further comprising:
- dispensing a cleaning liquid into the reaction vessel and suctioning the dispensed cleaning liquid after the measurement specimen is suctioned from the reaction vessel by the suction pipette.

8. The detection method according to claim 6, further comprising:
- transporting the rack along the first axis toward a second reagent dispensing position for dispensing a second reagent different from the aforesaid reagent; and
- linearly moving the second reagent dispensing pipette which is different from the aforesaid reagent dispensing pipette above the rack along a fifth axis intersecting the first axis, and dispensing the second reagent into the reaction vessel located at the second reagent dispensing position.

9. The detection method according to claim 8, wherein the second axis, the third axis, the fourth axis, and the fifth axis are parallel to each other.

10. The detection method according to claim 1, wherein a sample container containing the sample is detected; and when the sample container is detected, the rack is transported to the sample dispensing position.

11. The detection method according to claim 1, wherein the detecting the detection target includes detecting the detection target in the measurement specimen passing through a flow cell.

12. The detection method according to claim 11, wherein the reagent contains an antibody; the sample contains cells; and the detection target contains an antigen on the cell surface that has reacted with the antibody.

13. A detection device comprising:
- a transport unit that includes a motor and transports a rack holding a reaction vessel along a first axis;
- a sample dispensing pipette that dispenses a sample into the reaction vessel;
- a reagent dispensing pipette that dispenses reagent into the reaction vessel;
- a pipette moving unit that includes one or more motors and linearly moves the sample dispensing pipette above the rack along a second axis intersecting the first axis in a top view, and linearly moves the reagent dispensing pipette above the rack along a third axis intersecting the first axis in a top view;
- a swing mechanism that includes a motor and swings the rack in a horizontal plane; and
- a detection unit that includes a flow cell that detects a detection target in a measurement specimen prepared from the sample and the reagent.

14. The detection device according to claim 13, wherein the pipette moving unit linearly moves the sample dispensing pipette and the reagent dispensing pipette individually.

15. The detection unit according to claim 13, wherein the pipette moving unit includes a sample dispensing pipette moving unit that linearly moves the sample dispensing pipette in a horizontal direction and a reagent dispensing pipette moving unit that includes one or more motors and linearly moves the reagent dispensing pipette in parallel with the moving direction in the horizontal direction of the sample dispensing pipette; and
the transport unit horizontally moves the rack in a direction intersecting the moving directions in the horizontal direction of the sample dispensing pipette and the reagent dispensing pipette, and moves the reaction vessel to a sample dispensing position and a reagent dispensing position, respectively.

16. The detection device according to claim 15, wherein the rack holds reaction vessels in a grid pattern parallel to the first axis and the second axis;
the transport unit is configured to locate a row of the reaction vessels including one reaction vessel to be a dispensing target below a moving path of the sample dispensing pipette; and
the sample dispensing pipette moving unit is configured to linearly move the sample dispensing pipette along the second axis so that the sample dispensing pipette accesses one reaction vessel to be a dispensing target among a row of the reaction vessels below the moving path.

17. The detection device according to claim 13, wherein the reagent dispensing pipette is an antibody dispensing pipette that dispenses an antibody into the reaction vessel.

18. The detection device according to claim 17, further comprising:
- a housing for accommodating the transport unit and the pipette moving unit; and
- an antibody set unit provided on a front surface side of the housing and including a surface on which an antibody reagent container containing an antibody reagent is set, wherein the pipette moving unit linearly moves the antibody dispensing pipette along the third axis so as to be located at a suction position of the antibody reagent.

19. The detection device according to claim 13, further comprising:
a control unit that includes a processor and controls the transport unit so that the reaction vessel is transported to a sample dispensing position for dispensing the sample, and controls the pipette moving unit so that the sample dispensing pipette is moved to the sample dispensing position.

20. The detection device according to claim 19, wherein
the reagent dispensing pipette is an antibody dispensing pipette that dispenses an antibody into the reaction vessel; and
the control unit controls the transport unit so that the reaction vessel is transported to an antibody dispensing position for dispensing the antibody before the sample is dispensed into the reaction vessel, and controls the transport unit so that the antibody dispensing pipette is moved to the antibody dispensing position.

* * * * *